(12) United States Patent
Okada et al.

(10) Patent No.: US 6,278,505 B1
(45) Date of Patent: Aug. 21, 2001

(54) LIQUID CRYSTAL REFLECTIVE DISPLAY

(75) Inventors: Masakazu Okada, Takatsuki; Takuji Hatano; Kiyofumi Hashimoto, both of Suita, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/586,955

(22) Filed: Jun. 5, 2000

Related U.S. Application Data

(62) Division of application No. 08/759,347, filed on Dec. 3, 1996.

(30) Foreign Application Priority Data

| Dec. 4, 1995 | (JP) | 7-315147 |
| Sep. 12, 1996 | (JP) | 8-241951 |

(51) Int. Cl.[7] .......................... G02F 1/1347; G02F 1/137
(52) U.S. Cl. .................. 349/78; 349/110; 349/165; 349/176
(58) Field of Search ................. 349/78, 79, 80, 349/115, 158, 165, 176, 110

(56) References Cited

U.S. PATENT DOCUMENTS

| 3,578,844 | 5/1971 | Kettering et al. |
| 5,200,845 | 4/1993 | Crooker et al. ............ 349/176 |
| 5,437,811 | 8/1995 | Doane et al. |
| 5,493,430 | 2/1996 | Lu et al. ..................... 349/185 |
| 5,508,831 | * 4/1996 | Nakamura et al. ......... 349/165 |
| 5,691,790 | 11/1997 | Havens et al. .............. 349/115 |
| 5,724,109 | 3/1998 | Nakamura et al. ......... 349/176 |
| 5,847,798 | 12/1998 | Yang et al. ................. 349/115 |

OTHER PUBLICATIONS

"Chromaticity of Polymer–Dispersed Cholesteric Liquid Crystal", by H.S. Kitszerow et al., Liquid Crystals, vol. 12, No. 49–58. –1992–No Date.

* cited by examiner

Primary Examiner—William L. Sikes
Assistant Examiner—Tai V. Duong
(74) Attorney, Agent, or Firm—McDermott, Will & Emery

(57) ABSTRACT

A liquid crystal reflective display comprising cholesteric liquid crystal capable of selectively reflecting spectral rays of a specific wavelength in a visible range; and a carrier carrying said cholesteric liquid crystal, wherein at least one of said cholesteric liquid crystal and said carrier contains a coloring agent absorbing spectral rays in a wavelength range different from the selective reflection wavelength of said cholesteric liquid crystal.

34 Claims, 12 Drawing Sheets

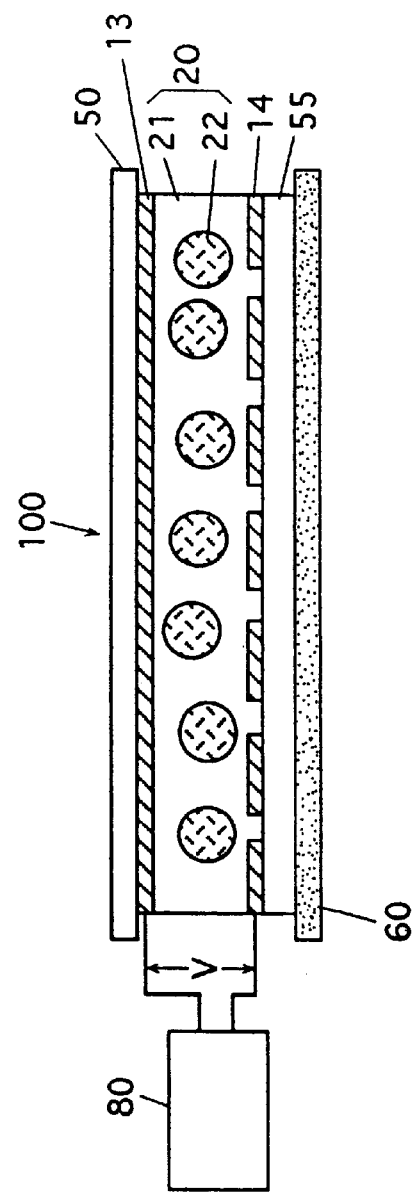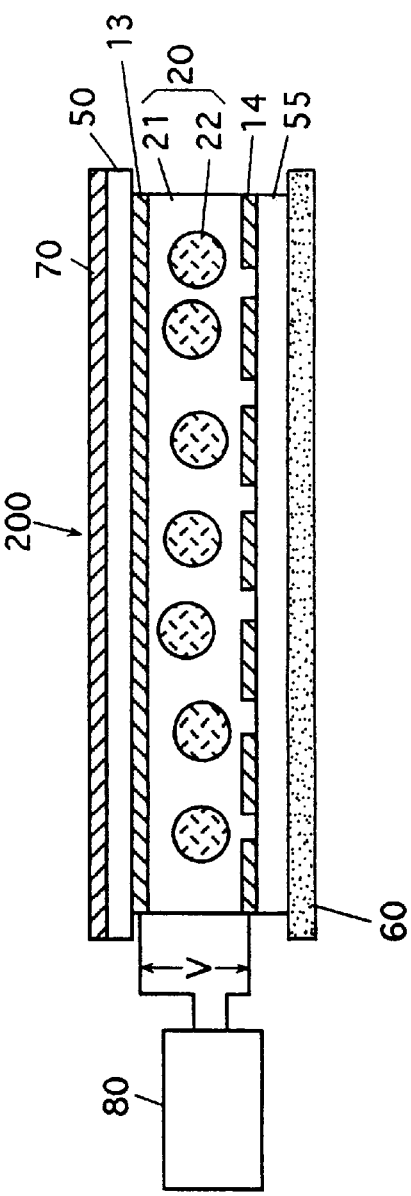

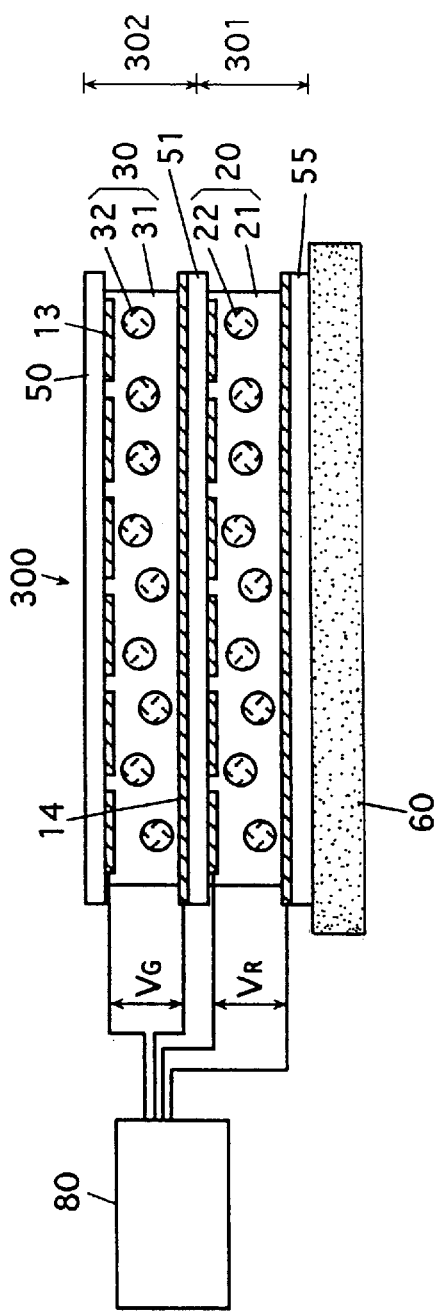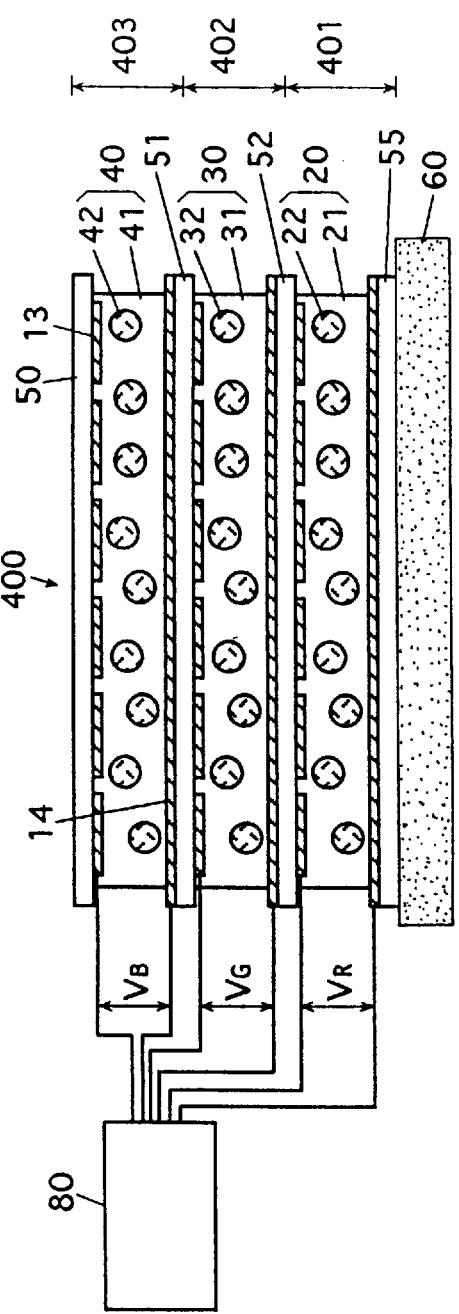

LIQUID CRYSTAL REFLECTIVE DISPLAY

This application is a Divisional of application Ser. No. 08/759,347 filed Dec. 3, 1996.

BACKGROUND OF THE INVENTION

1. Field of the Invention

The present invention relates to a liquid crystal reflective display which reflects incident rays by a liquid crystal to perform display.

2. Description of the Related Art

Various types of liquid crystal display devices have been proposed. For example, TFT liquid crystals including thin-film transistors for respective pixels are now available. Although the TFT liquid crystals can perform high-resolution display, they require precise and complicated manufacturing steps, and further suffer from low yields and therefore high costs.

Therefore, attention has been given to polymer dispersion liquid crystal display devices employing a liquid crystal and polymer composite film in which liquid crystal is dispersed in a polymer material, because the devices can be manufactured relatively easily. For example, U.S. Pat. No. 3,578,844 has disclosed a liquid crystal display device having a composite film of liquid crystal and polymer, in which cholesteric liquid crystal is used and dispersed in a polymer material.

In this specification, a side opposed to a surface, on which a liquid crystal reflective display displays an image, is referred to as an observation side.

The cholesteric liquid crystal contained in the polymer dispersion liquid crystal display device has a memory effect to attain stably two states even while a voltage is not being applied. Therefore, high-resolution display can be performed only by simple matrix drive without using complicated circuits provided with active elements such as TFT liquid crystal.

Examples of the polymer dispersion liquid crystal reflective displays of the above type are disclosed in U.S. Pat. No. 5,200,845 and Japanese Tokuhyohei No. 6-507505 (JP, A, No. 6-507505). These liquid crystal display devices perform color display with a colored transparent state attained by selective reflection by a cholesteric phase and a scattered state thereof. This is achieved by reflective display performed in such a manner that the chiral nematic liquid crystal selectively attains the light transmission state, in which helical axes attain a random focal conic state owing to application of a low-voltage pulse, and the selective reflection state, in which helical axes are aligned to attain a planar state owing to application of a high-voltage pulse. In LIQUID CRYSTALS, 1992, Vol. 12, No. 1, pp. 49–58, such a structure is disclosed that liquid crystal display layers, of which selective reflection wavelengths correspond to red, green and blue light, respectively, are layered, and simple matrix drive of each display layer is performed independently of the other layers, so that reflective display rays of red, green and blue are produced.

However, the liquid crystal reflective display devices which have been proposed cannot perform display at a sufficiently high quality. In particular, it has been found from the study by the inventors that, as the selective reflection wavelength of liquid crystal increases, the transparency in the transparent state as well as the clarity of the displayed color in the selective reflection state are impaired to a higher extent, which impairs the display quality.

The selective reflection wavelengths of the cholesteric liquid crystal have a viewing angle dependency, and the displayed color changes when viewed obliquely. Therefore, good white display cannot be performed, when all the layers, i.e., red, green and blue display layers are simultaneously set to the reflection state in the above display device having the three-layer structure.

As described above, a liquid crystal display capable of good white and color display has not been available.

SUMMARY OF THE INVENTION

An object of the invention is to provide a novel and useful liquid crystal reflective display overcoming the above problems.

Another object of the invention is to provide a liquid crystal reflective display capable of high-quality display.

Still another object of the invention is to provide a liquid crystal reflective display having a simple structure.

Yet another object of the invention is to provide a liquid crystal reflective display, in which a transparency in a transparent state of liquid crystal is improved, and a clarity of a displayed color in a selective reflection state of the liquid crystal is also improved.

Further another object of the invention is to provide a liquid crystal reflective display capable of good white display and good color display.

A further object of the invention is to provide a liquid crystal reflective display capable of good white display even when viewed obliquely.

In order to achieve the above object, a liquid crystal reflective display of a first type according to the invention includes cholesteric liquid crystal capable of selectively reflecting spectral rays of a specific wavelength in a visible range, and a carrier carrying the cholesteric liquid crystal, wherein at least one of the cholesteric liquid crystal and the carrier contains a coloring agent absorbing spectral rays in a wavelength range different from the selective reflection wavelength of the cholesteric liquid crystal.

In order to achieve the above objects, a liquid crystal reflective display of a second type according to the invention includes a carrier substrate, and a plurality of display layers layered on the carrier substrate and each containing cholesteric liquid crystal capable of selective reflection of spectral rays of a specific wavelength in a visible range, wherein predetermined one of the display layers or at least one of the display layer(s) located at an observation side with respect to the predetermined display layer contains a coloring agent absorbing spectral rays in a wavelength range different from the selective reflection wavelength of the cholesteric liquid crystal contained in the predetermined display layer.

In order to achieve the above object, a liquid crystal reflective display of a third type according to the invention includes at least one color display layer and a white display layer which are layered together, the color display layer including liquid crystal and a carrier carrying the liquid crystal, and being responsive to a voltage applied thereto to attain selectively a selective reflection state for selectively reflecting visible rays of a specific wavelength and a light transmission state allowing transmission of visible rays therethrough, and the white display layer including liquid crystal and a carrier carrying the liquid crystal, and being responsive to a voltage applied thereto to attain selectively a light transmission state allowing transmission of the visible rays and a light scattering state scattering the visible rays.

These and other objects, advantages and features of the present invention will become more apparent from the following detailed description thereof taken in conjunction witch the accompanying drawings which illustrate specific embodiments of the invention.

BRIEF DESCRIPTION OF THE DRAWINGS

In the following description, like parts are designated by like reference numbers throughout the several drawings.

FIG. 1 is a cross section of a liquid crystal display of an embodiment of the invention;

FIG. 2 is a cross section of a liquid crystal display of another embodiment of the invention;

FIG. 3 is a cross section of a liquid crystal display of still another embodiment of the invention;

FIG. 4 is a cross section of a liquid crystal display of yet another embodiment of the invention;

DESCRIPTION OF THE PREFERRED EMBODIMENTS

Figure 5:
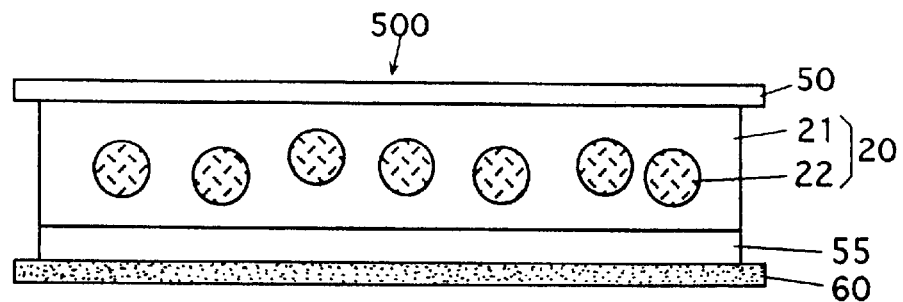
FIG. 5 is a cross section of a liquid crystal display of further another embodiment of the invention.

Embodiments of the invention will be described below with reference to the drawings. Embodiments 1 to 7 are aimed at improvement of display quality by improving clarities of displayed colors. Embodiments 8 to 10 are aimed at improvement of display quality by preventing color shift in white display. In the following description, members of similar functions bear the same reference numbers, and will not be repetitively described in detail.

[First Embodiment]

FIG. 1 is a cross section of a liquid crystal display 100 of a first embodiment of the invention. As shown in FIG. 1, the liquid crystal display 100 includes a transparent plate 55, a transparent electrode 14, a liquid crystal and polymer composite film 20 including a polymer material 21 and liquid crystal 22 dispersed therein, a transparent electrode 13 and a transparent plate 50 which are layered in this order.

Transparent electrodes 13 and 14 are connected to a power supply 80, which applies a voltage across the transparent electrodes 13 and 14. In response to this applied voltage, the liquid crystal and polymer composite film 20 changes its state from a transparent state for allowing transmission of visible rays to a selective reflection state for selectively reflecting visible rays of a specific wavelength and vice versa, as will be described later in detail. When the composite film 20 is in the selective reflection state, and white rays such as natural light rays are irradiated downward in FIG. 1 to the liquid crystal display 100, the composite film 20 reflect the visible rays of a specific wavelength, which are observed as display of a specific color.

In the liquid crystal display 100, at least one of the polymer material 21, liquid crystal 22, transparent electrode 13 at the observation side and the transparent plate 50 at the observation side contains a coloring agent added thereto. This coloring agent can absorb spectral rays in a wavelength range different from the selective reflection wavelength range of the liquid crystal 22. The coloring agent can absorb light components, which may cause turbidity of color in the color display performed by selective reflection of the liquid crystal 22 or may cause lowering of a transparency in the transparent state of the liquid crystal 22, and therefore can improve the display quality. Two or more of the components in the liquid crystal display 100 may contain a coloring agent. For example, both the polymer 21 and the liquid crystal 22 may contain the coloring agent.

The coloring agent added to the liquid crystal display 100 may be selected from various kinds of known coloring agent which has spectral properties of absorbing spectral rays in a wavelength range different from the selective reflection wavelength range of the liquid crystal 22. In particular, it is preferable to use a coloring agent having a peak in the light absorbing properties which appears in a wavelength range different from the selective reflection wavelength range of the liquid crystal 22. As will be described later, it is considered that the light component which lowers the display quality is primarily present at a lower wavelength area. Therefore, it is more preferable to use a coloring agent, which absorbs rays in a range of shorter wavelengths than the selective reflection wavelength of the liquid crystal 22. For example, red coloring agent is preferable, if the liquid crystal 22 selectively reflects the red. Yellow or green coloring agent is preferable, if liquid crystal 22 selectively reflects the green. Even the coloring agent which slightly absorbs the light in the selective reflection wavelength range of the liquid crystal, it can be used provided that the agent can sufficiently absorb the spectral rays in a wavelength range different from the selective reflection wavelength range of the liquid crystal 22.

More specifically, the coloring agent added to the liquid crystal display 100 may be selected, for example, from various kinds of dyestuff such as dyestuff for resin coloring and dichromatic dyestuff for liquid crystal display. The dyestuff for resin coloring may be SPR RED1 (manufactured by Mitsui Toatsu Senryo Co., Ltd.). The dichromatic dyestuff for liquid crystal is specifically SI-424 or M-483 (both manufactured by Mitsui Toatsu Senryo Co., Ltd.). Among these kinds of dyestuff, appropriate dyestuff can be selected for absorbing spectral rays in a wavelength range different from the selective reflection wavelength of the liquid crystal 22.

An amount of added coloring agent is not specifically restricted provided that addition of the coloring agent does not remarkably impair switching operation characteristics of the liquid crystal for display, and that, if the polymer is formed by polymerization as will be described later, the addition does not inhibit the polymerization. However, it is preferable that the quantity of added coloring agent is 0.1 weight % or more with respect to the liquid crystal. Further, about 5 weight % or less is desirable, and about 0.5 weight % is a sufficient amount in many cases.

Instead of use of the coloring agent, resin or the like, which is originally colored and therefore does not require additional coloring agent, may be used as the polymer material 21, transparent electrode 13 and transparent plate 50. However, addition of coloring agent is more advantageous because a degree of the absorbing effect can be controlled by adjusting the quantity of the coloring agent.

According to the investigation by the inventors, the following fact has been found, although specific reasons are not clear. Rays of a wavelength longer than the selective reflection wavelength of the liquid crystal can pass through the liquid crystal and polymer composite film to a higher extent. Conversely, rays of a wavelength shorter than the selective reflection wavelength of the liquid crystal scatters in the liquid crystal and polymer composite film to a higher extent, as the wavelength decreases. Therefore, the liquid crystal and polymer composite film selectively reflecting visible rays of a longer wavelength such as red rays can effectively improve the clarity of the displayed color and the transparency in the transparent state. In the liquid crystal display for green or blue display, addition of the coloring agent can improve the clarity of the displayed color in the selective reflection state only to an extent lower than the case of red display, but the effect of improving the clarity in the transparent state can be achieved to an extent similar to that in the case of red display.

The transparent plates 50 and 55 may be a colorless and transparent glass plates or polymer films of polyethylene terephthalate, polyether sulfone, polycarbonate or the like. This embodiment employs the transparent plates 50 and 55 on which transparent electrodes 13 and 14 are layered, respectively. Alternatively, transparent plates which have electric conductivity in itself may be employed.

At 60 is indicated a light absorber, which may be arranged at the lowermost position viewed from the observation side, if desired. The light absorber 60 absorbs the rays of the wavelength other than the selective reflection wavelength of the liquid crystal and polymer composite film 20, so that black display can be performed when the cholesteric liquid crystal does not perform the selective reflection in the visible light region. The light absorber may be a black film. The light absorber may be provided by applying black dye such as black ink to the lowermost surface of the display viewed from the observation side.

Each of the paired transparent electrodes 13 and 14 forming the liquid crystal display 100 is formed of a plurality of band-shaped electrode elements which are parallel to each other with a fine space therebetween. The band-shaped electrode elements of the transparent electrode 13 are perpendicular to those of the transparent electrode 14 opposed to the electrode 13. A voltage is successively supplied to the upper and lower band-shaped electrode elements, and a voltage is successively applied in a matrix manner to the liquid crystal and polymer composite film 20 (i.e., matrix drive is performed). owing to this matrix drive, the liquid crystal display 100 can display images.

A voltage in a pulse form is preferably used as a voltage to be applied across the transparent electrodes 13 and 14 by the power supply 80 for selecting the colored states of the liquid crystal display 100.

The liquid crystal and polymer composite film 20 included in the liquid crystal display 100 may be made of a liquid crystal and polymer composite member, which is fabricated in such a manner that light such as ultraviolet light is irradiated to mixture of liquid crystal and photo-curing resin material for hardening the mixture and thereby causing phase separation between the liquid crystal and the resin.

Cholesteric liquid crystal is used as the liquid crystal 22 used in the liquid crystal and polymer composite film 20 included in the liquid crystal display 100. The cholesteric liquid crystal has a layered structure in which major axes of liquid crystal molecules are oriented parallel, and each layer has a spiral structure in which neighboring molecules have long axes shifted slightly from each other.

It is particularly preferable that the cholesteric liquid crystal exhibits a cholesteric phase at a room temperature.

The cholesteric liquid crystal may be a chiral nematic liquid crystal produced by adding a chiral dopant to a nematic liquid crystal.

The nematic liquid crystal contains columnar liquid crystal molecules parallel to each other, but does not have a layered structure. Preferably, the nematic liquid crystal has a positive dielectric anisotropy, and therefore contains, e.g., cyanobiphenyl, tolane or pyrimidine. More specifically, MN1000XX (manufactured by Chisso Co., Ltd.) as well as ZLI-1565 and BL-006 (both manufactured by Merck Co., Ltd.) may be used.

Chiral dopant is used as additive to the nematic liquid crystal for twisting the molecules of the nematic liquid crystal. owing to addition of the chiral dopant to the nematic liquid crystal, a spiral structure of the liquid crystal molecules having a predetermined pitch length is formed, and thereby the cholesteric phase is produced.

The chiral nematic liquid crystal has such a feature that the pitch length of the spiral structure thereof can be varied by varying the amount of chiral dopant added thereto, and therefor has such an advantage that the selective reflection wavelength of the liquid crystal can be controlled by varying the amount of chiral dopant. In general, the pitch length of a spiral structure of liquid crystal molecules is represented by a helical pitch length, which is defined by a distance between liquid crystal molecules rotated 360 degrees along the spiral structure.

The chiral dopant may be compound having asymmetric carbon and capable of inducing optical rotary power in liquid crystal molecules. For example, it is possible to use a cholesteric liquid crystal having cholesteric rings, a chiral nematic liquid crystal or an organic compound which does not exhibit liquid crystal properties but can twist molecules of nematic liquid crystal. As typical chiral dopant, S811, S1011, CB15, CE2 and others manufactured by Merck Co., Ltd. are available.

The chiral dopant added to the nematic liquid crystal may be mixture of several kinds of chiral dopant. Use of several kinds of chiral dopant is effective in increasing a phase transition temperature of the liquid crystal, reducing change in the selective reflection wavelength caused by change in temperature, improving the transparency of the composite film in the transparent state and achieving rapid change in a display manner between the transparent state and the selective reflection state of the liquid crystal display.

The liquid crystal and polymer composite film formed of such liquid crystal and the polymer can be switched, in response to the voltage application, between the transparent state allowing transmission of the visible rays and the selective reflection state for selectively reflecting the visible rays of a specific wavelength, or between the light scattering state for scattering the visible rays and the transparent state allowing transmission of the visible rays, and further can maintain these states even when a voltage is not applied thereto.

In the liquid crystal and polymer composite film using the chiral nematic liquid crystal described above, the orientation state of liquid crystal molecules can be switched between the planar state and the focal conic state by selectively applying two kinds of, i.e., high and low pulse voltages. Thereby, the liquid crystal display using the liquid crystal and polymer composite film can be switched between the transparent state and the selective reflection state.

In the liquid crystal and polymer composite film using the chiral nematic liquid crystal, the amount of chiral dopant added to the nematic liquid crystal is controlled to adjust the helical pitch length of the chiral nematic liquid crystal and thereby set the selective reflection wavelength to a value, for example, corresponding to red, green or blue. Thereby, the liquid crystal and polymer composite film can attain the selective reflection state colored in red, green or blue in the planar state, and can attain the colorless transparent state in the focal conic state. The liquid crystal and polymer composite film thus formed is held between the transparent electrodes to complete the color liquid crystal display.

The relationship between the helical pitch length p (nm) and the selective reflection wavelength $\lambda$ (nm) is expressed by the following formula [I]

$$\lambda = n \times p \qquad [I]$$

where n represents an average refractive index, and can be represented by the following formula:

$$n^2 = (n_1^2 + n_2^2)/2$$

where $n_1$ represents the refractive index in the case where rays are irradiated along the major axes of liquid crystal molecules, and $n_2$ represents the refractive index in the case where rays are irradiated in a direction perpendicular to the major axes of the liquid crystal molecules.

The liquid crystal display 100 may be fabricated, for example, in such a manner that mixture of the liquid crystal and the photo-curing resin material is held between a pair of transparent plates, and rays such as ultraviolet rays are irradiated thereto to harden the photo-curing resin material in the mixture and thereby causing phase separation between the liquid crystal and the resin. In this process, a spacer may be arranged together with the mixture between the transparent plates, which facilitates control of the thickness of the liquid crystal and polymer composite film.

The photo-curing resin material may be a liquid mixture containing a photo-curing monomer (or oligomer) and a photo polymerization initiator, and, for example, may be various kinds of acrylic monofunctional resin, acrylic polyfunctional resin or the like. More specifically, adamantane acrylate BF-530 (Daihachi Kagaku Co., Ltd.), TPA-320 (Nippon Kayaku Co., Ltd.) or the like may be used.

When the liquid mixture of the photo-curing monomer (or oligomer) and the photo polymerization initiator is used, such a photo-induced phase separating method may be employed that the mixture and the liquid crystal are mixed and then are irradiated with ultraviolet rays to photo-cure the resin material and thereby cause the phase separation between the liquid crystal and the resin. As the photo polymerization initiator may be a material in which radiation of ultraviolet rays induces polymerization such as radical polymerization of the photo-curing resin, and more specifically, may be DAROCUR1173, IGRACUR184 (both manufactured by Chiba Gaigy Co., Ltd.) or the like.

[Second Embodiment]

FIG. 2 is a cross section of a liquid crystal display 200 of a second embodiment of the invention. As shown in FIG. 2, the liquid crystal display 200 has a structure similar to that shown in FIG. 1 except for that a coloring agent is not added thereto, and alternatively a colored filter 70 having properties of absorbing rays in a wavelength range different from the selective reflection wavelength range of the liquid crystal 22 is arranged at the surface of the liquid crystal display.

This embodiment does not employ such a structure that a coloring agent is added to at least one of components, i.e., the liquid crystal and polymer composite film 20, transparent electrodes 13 and 14, transparent plates 50 and 55, but alternatively employ such a structure that a plate member, a sheet member or the like forming a colored filter layer such as a color glass filter, a colored resin film (color film) is arranged at the observation side of the liquid crystal display. Owing to this structure, an effect similar to that already described can be achieved. The filter 70 may be made of a colorless transparent material containing pigment added thereto, a material which is originally colored without addition of the coloring agent, a thin film of specific substance having a function similar to the foregoing coloring agent, or the like.

Such a structure may also be employed that the coloring agent is added to at least one of components, i.e., the liquid crystal and polymer composite film 20, transparent electrodes 13 and 14, and transparent plates 50 and 55, and the colored filter 70 is also additionally arranged. The transparent plate 50 itself at the observation side may be replaced with the colored filter 70.

[Third Embodiment]

FIG. 3 is a cross section of a liquid crystal display 300 of a third embodiment of the invention. As shown in FIG. 3, the liquid crystal display 300 includes a red display layer 301 which selectively reflects the red for red display, and a green display layer 302 which is layered on the layer 301 and selectively reflects the green for green display.

The red display layer 301 has a structure similar to that already described in connection with the first embodiment. The green display layer 302 has a structure similar to that already described in connection with the first embodiment except for that the liquid crystal and polymer composite film 30 uses liquid crystal selectively reflecting the green. In this embodiment, however, the transparent substrate 51 serves as an upper member of the red display layer 301 and a lower member of the green display layer 302. Naturally, independent upper and lower members may be layered together.

A green display layer 302 is fabricated, for example, by controlling the quantity of the chiral dopant added to the nematic liquid crystal and thereby adjusting the helical pitch of the chiral nematic liquid crystal to set the selective reflection wavelength to a value corresponding to the green light. Addition of a coloring agent in the liquid crystal display 300 will be described later.

The liquid crystal display 300 can perform the red display when the green display layer 302 is set to the transparent state and the red display layer 301 is set to the selective reflection state. By setting the green display layer 302 to the selective reflection state, the green display is performed. By simultaneously setting the green and red display layers 302 and 301 to the selective reflection state, mixed color of green and red, i.e., yellow is displayed. By simultaneous matrix drives of both the layers 302 and 301, intermediate color display can be falsely performed with matrixes of red and green.

In the liquid crystal display 300, if the red display layer 301 contains a coloring agent which absorbs spectral rays in a wavelength range different from the selective reflection wavelength range of the liquid crystal 22 similarly to the foregoing structure in the first embodiment, the quality of red display can be improved. However, in the structure where the liquid crystal display layers are layered as is done in this embodiment, it is preferable to suppress an influence which the upper layer may exert on the light reflection by the lower layer. In other words, it is preferable that the wavelength of the light absorbed by the coloring agent in the upper layer does not overlap with the selective reflection wavelength of the display layer at the lower layer.

Accordingly, the liquid crystal display 300 may contain the coloring agent added in the following manner.

(1) A coloring agent (e.g., red dye) absorbing rays in a wavelength range different from the selective reflection wavelength range of the liquid crystal 22 is added to the liquid crystal and polymer composite film 20 of the red display layer 301, and a coloring agent is not added to the liquid crystal and polymer composite film 30 of the green display layer 302, whereby the clarity of red display and a transparency in the transparent state of the red display layer 301 can be enhanced without impairing the quality of green display by the green display layer 302.

(2) Without adding a coloring agent to the liquid crystal and polymer composite film 20 of the red display layer 301, a blue-absorbing coloring agent (e.g., yellow dye) may be added to the liquid crystal and polymer composite film 30 of the green display layer 302, whereby the clarity of green display and a transparency in the transparent state of the green display layer 302 can be enhanced without impairing the quality of red display by the red display layer 301.

(3) A coloring agent (e.g., red dye) absorbing rays in the wavelength range different from the selective reflection wavelength range of the liquid crystal 22 may be added to the liquid crystal and polymer composite film 20 of the red display layer 301, and a blue-absorbing coloring agent (e.g., yellow dye) may be added to the liquid crystal and polymer composite film 30 of the green display layer 302, whereby the display quality of the red and green display layers can be improved.

In this embodiment, positions of addition of the coloring agent can be appropriately selected similarly to the first embodiment, and a colored filter may be employed instead of addition of the coloring agent already described in the second embodiment.

[Fourth Embodiment]

FIG. 4 is a cross section of a liquid crystal display 400 of a fourth embodiment of the invention. As shown in FIG. 4, a green display layer 402 selectively reflecting green light is layered on a red display layer 401 selectively reflecting red light, and a blue display layer 403 selectively reflecting blue light is layered on the layer 402.

The red and green display layers 401 and 402 have structures similar to those already described in the third embodiment. The blue display layer 403 has a structure similar to that in the first embodiment except for that a liquid crystal and polymer composite film 40 performs selective reflection of blue light. Addition of a coloring agent will be described later. In this embodiment, a transparent substrate 52 is arranged at a boundary between the red display layer 401 and the green display layer 402, and a transparent substrate 51 is arranged at a boundary between the green display layer 402 and the blue display layer 403.

Red display can be performed by setting the blue and green display layers 403 and 402 to the transparent state and setting the red display layer 401 to the selective reflection state. By setting the blue display layer 403 to the transparent state and setting the green display layer 402 to the selective reflection state, green display can be performed. Further, blue display can be performed by setting the blue display layer 403 to the selective reflection state.

The clarity of display of the liquid crystal display 400 can be increased by adding a coloring agent (e.g., red dye) absorbing rays in a wavelength range different from the selective reflection wavelength of the liquid crystal 22 similarly to the first embodiment. As already described in connection with the embodiment 3, the liquid crystal display may have a layered structure, in which case it is preferable to suppress an influence exerted on the light reflection of the lower layer by the upper layer. For this purpose, the liquid crystal display 400 may contain, for example, a red coloring agent added to the composite film of the red display layer, and a blue-absorbing coloring agent (e.g., yellow coloring agent) added to the composite film of the green display layer without adding a coloring agent to the blue display layer.

The third and fourth embodiments have been described in connection with examples which include two-layer or three-layer structures formed of liquid crystal display layers displaying different colors, respectively. The order of layering, the number of layers, the kinds of colors and others are not restricted to those in the foregoing embodiments, and may be varied in various manners. For example, the layering order of the layers viewed from the observation side may be red-green-blue, green-red-blue, blue-blue-green-red or blue-red. In summary, the layering order of the liquid crystal display layers, the number of layers, the kinds of colors, the kinds of added coloring agents and others are not restricted provided that the added coloring agent does not impede the color display by the display layers at the lower levels viewed from the observation side.

Liquid crystal display layers of the same color may be layered. For example, a red liquid crystal display layer of cholesteric liquid crystal having a right optical rotary power or a right optical activity and a red liquid crystal display layer of cholesteric liquid crystal having a left optical activity may be layered together, and the coloring agent may be added only to the upper layer, whereby display brightness can be increased.

[Fifth Embodiment]

FIG. 5 is a cross section of a liquid crystal display 500 of a fifth embodiment of the invention. As shown in FIG. 5, the liquid crystal display 500 includes the transparent plate 55 on which the liquid crystal and polymer composite film 20 and the transparent plate 50 are successively layered. Similarly to the foregoing embodiments, this embodiment may include the light absorbing member 60 arranged at the lower surface of the liquid crystal display. The liquid crystal display 500 does not have an electrode layer in contrast to the foregoing embodiments, but can be fabricated in a manner similar to that already described in connection with the first embodiment. The liquid crystal display 500 is subjected to an electric field which is produced by external electrodes arranged above and below the same, and selectively attains the transparent state and the selective reflection state in accordance with the applied electric field.

The liquid crystal display 500 may have a sheet-like form, in which case it can be used as a recordable and erasable record medium by using the following voltage applying means.

Figure 6:
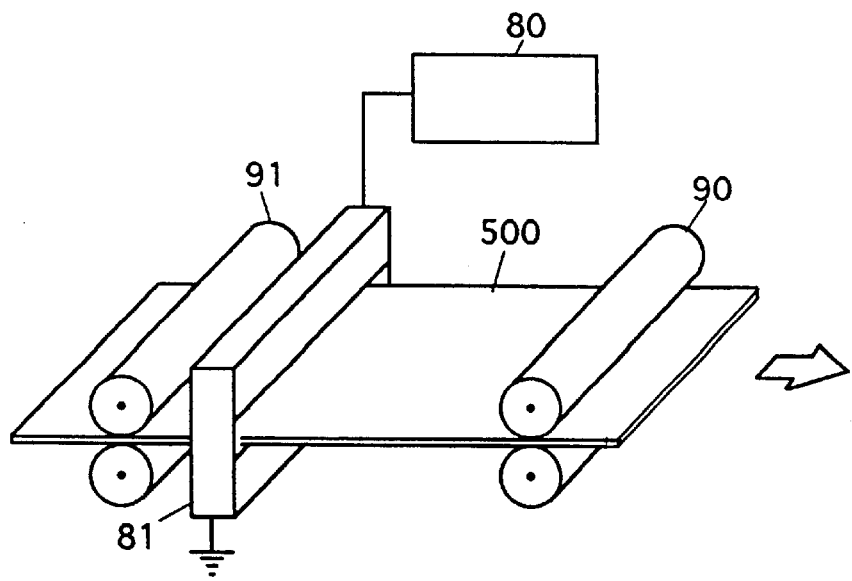
FIG. 6 schematically shows a structure for performing display by the liquid crystal display shown in FIG. 5.

FIG. 6 shows an embodiment of a structure for applying a voltage to the liquid crystal display 500. As shown in FIG. 6, the liquid crystal display 500 which is being transferred at a predetermined speed by transfer rollers 90 and 91 is supplied with a voltage corresponding to image information from an electrode array 81, so that an image is displayed on the liquid crystal display 500.

Figure 7:
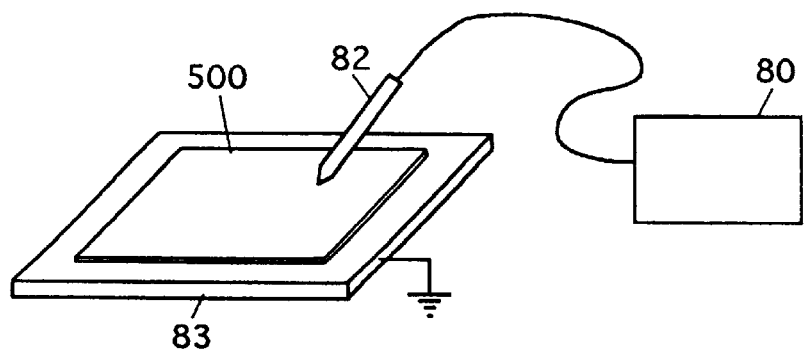
FIG. 7 schematically shows another form of a structure for performing display by the liquid crystal display shown in FIG. 5.

FIG. 7 shows another structure for applying a voltage to the liquid crystal display 500. As shown in FIG. 7, the liquid crystal display 500 is laid on a grounded electrode plate 83, and a pen-type electrode 82 is used to apply an electric field to the liquid crystal display 500. For example, an operator can draw an image on the liquid crystal display 500 with the electrode 82 in his/her hand.

[Sixth Embodiment]

The embodiments have been described as examples in which resin is used as a matrix containing cholesteric liquid crystal dispersed therein. However, the resin is not essential, and, for example, cholesteric liquid crystal may be directly held between two transparent substrates.

[Seventh Embodiment]

The embodiments have been described in connection with the examples in which the transparent substrates are arranged at upper and lower surfaces of the composite film containing cholesteric liquid crystal dispersed in matrix resin. However, the transparent substrates are not essential. For example, liquid crystal in the form of droplets may be dispersed in the resin, e.g., by increasing the quantity of resin in the composite film, whereby the transparent substrate can be eliminated.

The first embodiment will now be described further in detail in connection with specific experimental examples.

EXPERIMENTAL EXAMPLES 1

A chiral nematic liquid crystal having a selective reflection wavelength of 680 nm was prepared by such a manner that cholesteric liquid crystal CN (Merck Co., Ltd.) at 16 weight parts and chiral dopant S811 (Merck Co., Ltd.) at 8 weight parts were added, as chiral agent, to tolane nematic liquid crystal MN1000XX (Chisso Co., Ltd., $\Delta n=0.219$, $T_{NI}=69.9°$ C.) at 76 weight parts which contained fluorine and exhibited a nematic phase at a room temperature. $\Delta n$ represents a refractive index measured with d-line (of 589 nm in wavelength) of a mercury lamp. $T_{N1}$ represents a temperature at which change from a liquid phase to an isotropic phase occurs during rising of a temperature, and thus represents a phase transition temperature.

Then, a photo-curing resin material was prepared by adding photo polymerization initiator DAROCUR1173 (Chiba Gaigy Co., Ltd.) at 3 weight parts to the mixture containing metacrylate resin, i.e., adamantane metacrylate at 76 weight parts, acrylate resin BF-530 (Daihachi Kagaku Co., Ltd.) at 20 weight parts and acrylate resin TPA-320 (Nippon Kayaku Co., Ltd.) at 4 weight parts.

Dichromatic dyestuff SI-426 (Mitsui Toatsu Senryo Co., Ltd.) for liquid crystal display is added at a weight ratio of 0.1% with respect to the chiral nematic liquid crystal to the mixture of the chiral nematic liquid crystal and the photo-curing resin material at a weight ratio of 85:15.

Figure 8:
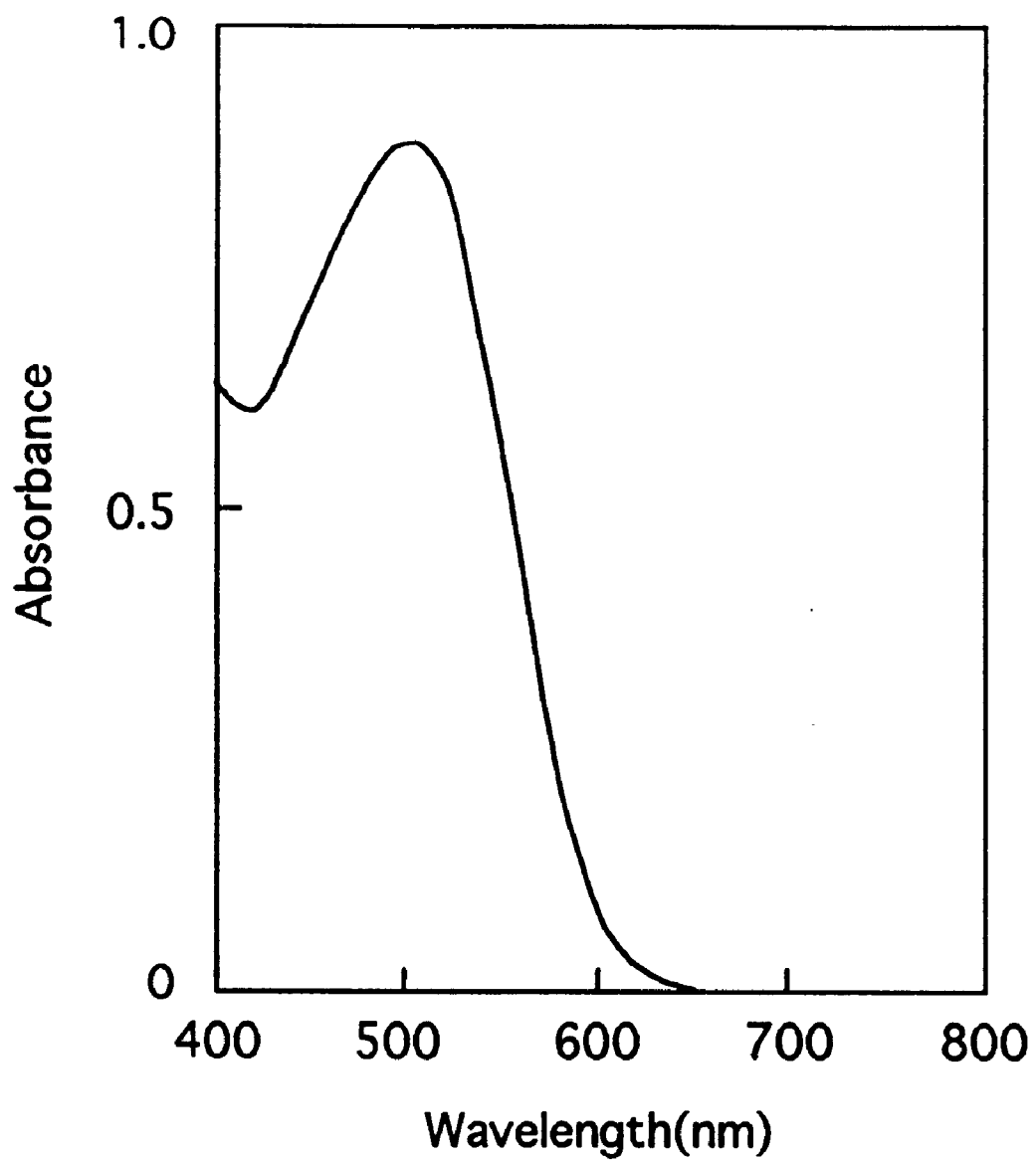
FIG. 8 shows spectral characteristics of a coloring agent.

FIG. 8 shows spectral characteristics of the above dyestuff. As shown in FIG. 8, this dyestuff is red dye having an absorption peak at the vicinity of 500 nm, and effectively absorbs visible rays of wavelengths shorter than 500 nm. Conversely, it hardly absorbs visible rays of a wavelength longer than 600 nm.

The mixture thus prepared was held between two glass plates provided at their surfaces with transparent conductive films directed inward with a spacer of 10 $\mu$m therebetween. Then, ultraviolet rays were irradiated at 15 mW/cm$^2$ to it at a room temperature for three minutes, whereby hardening and phase separation occurred. In this manner, the liquid crystal display having the structure shown in FIG. 1 was completed.

Figure 9:
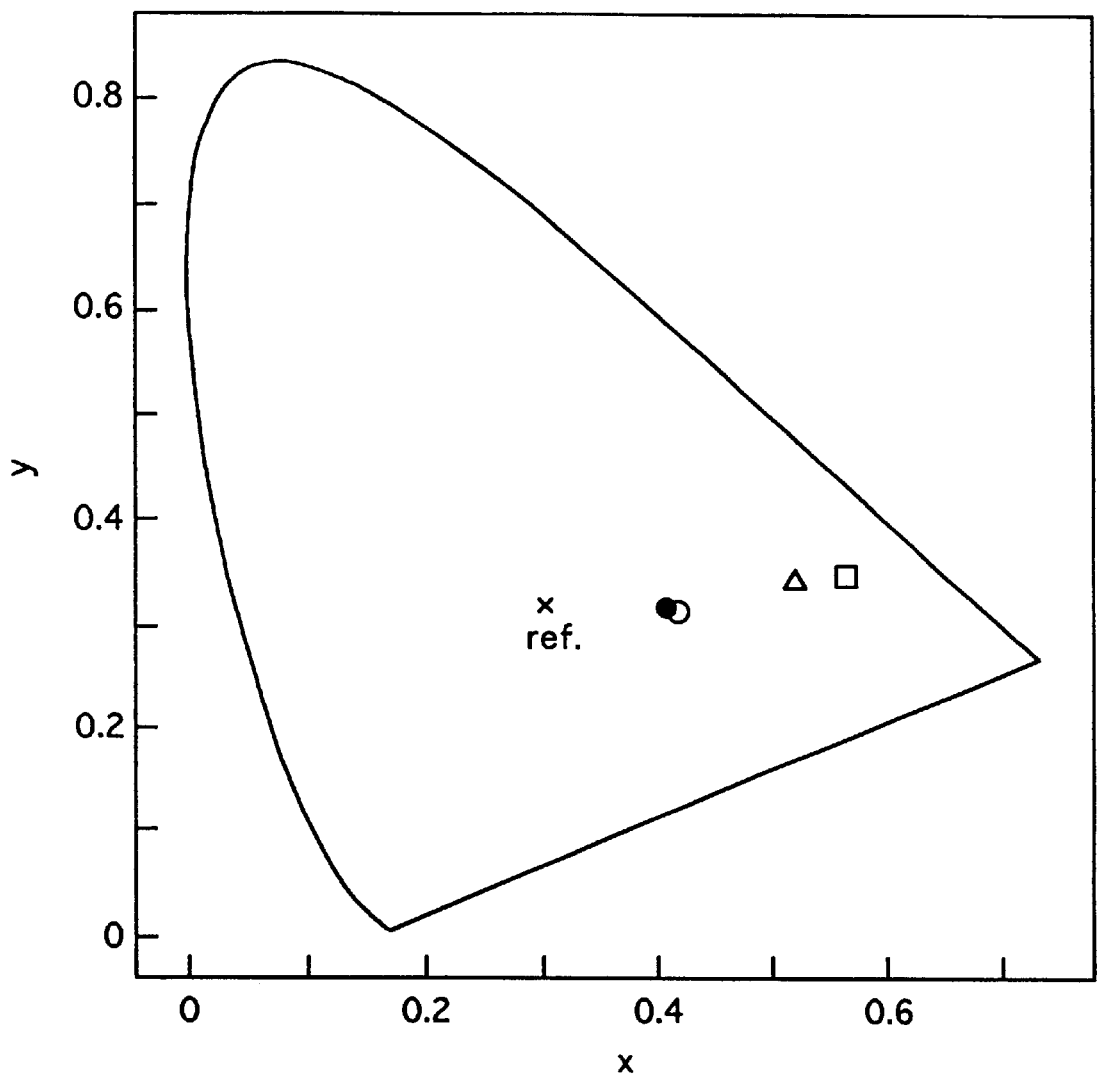
FIG. 9 shows chromaticity coordinates.

A pulse voltage ($\pm 5$ ms) of 150 V was applied across the conductive films of the liquid crystal display thus formed, so that red selective reflection occurred. At this time, luminous reflectance Y was 7.78, chromaticity coordinates were x=0.420 and y=0.319, and excitation purity was 28.2% (reference light: x=0.306, y=0.317). In this state, when a pulse voltage ($\pm 5$ ms) of 70 V was applied, the liquid crystal display exhibited a transparent state (luminous reflectance Y=0.60, chromaticity coordinates: x=0.210 and y=0.156). FIG. 9 shows chromaticity diagram, in which a circular mark represents the chromaticity coordinates in the selective reflection state of the liquid crystal display of this experimental example.

The excitation purity represents a ratio between a distance, by which a reference chromaticity point (X mark in FIG. 9) of illuminating light is spaced from a chromaticity point of a primary wavelength on a spectrum locus of the chromaticity coordinates, and a distance, by which the chromaticity point of illuminating light is spaced from the chromaticity point of the liquid crystal display sample. Thus, between two liquid crystal displays having the same brightness, the liquid crystal display having the chromaticity point remoter from the chromaticity point of illuminating light has the higher color purity (display quality).

The luminous reflectance and chromaticity coordinates were measured with a spectrocolorimeter CM-1000 (manufactured by Minolta Co., Ltd.). The excitation purity was calculated from the chromaticity coordinates of the liquid crystal display sample and the chromaticity coordinates of the reference light.

EXPERIMENTAL EXAMPLE 2

The experiment was performed with a liquid crystal display having the structure shown in FIG. 1 and prepared in accordance with the same steps as the experimental example 1 except for that the quantity of dyestuff added to the chiral nematic liquid crystal is 0.3 wt %. A pulse voltage ($\pm 5$ ms), of 150 V was applied across the conductive films of the liquid crystal display thus formed, so that red selective reflection occurred. At this time, luminous reflectance Y was 6.30, chromaticity coordinates were x=0.525 and y=0.341, and excitation purity was 64.6% (reference light: x=0.306, y=0.317). In this state, when a pulse voltage ($\pm 5$ ms) of 70 V was applied, the liquid crystal display exhibited a transparent state (luminous reflectance Y=0.53, chromaticity coordinates: x=0.253 and y=0.201). In FIG. 9, a triangular mark represents the chromaticity coordinate in the selective reflection state of the liquid crystal display of this experimental example.

EXPERIMENTAL EXAMPLE 3

The experiment was performed with a liquid crystal display having the structure shown in FIG. 1 and prepared in accordance with the same steps as the experimental example 1 except for that the quantity of dyestuff added to the chiral nematic liquid crystal is 0.5 wt %. A pulse voltage (±5 ms) of 150 V was applied across the conductive films of the liquid crystal display thus formed, so that red selective reflection occurred. At this time, luminous reflectance Y was 6.06, chromaticity coordinates were x=0.567 and y=0.345, and excitation purity was 76.6% (reference light: x=0.306, y=0.317). In this state, when a pulse voltage (±5 ms) of 70 V was applied, the liquid crystal display exhibited a transparent state (luminous reflectance Y=0.43, chromaticity coordinates: x=0.249 and y=0.195). In FIG. 9, a square mark represents the chromaticity coordinate in the selective reflection state of the liquid crystal display of this experimental example.

Figure 10:
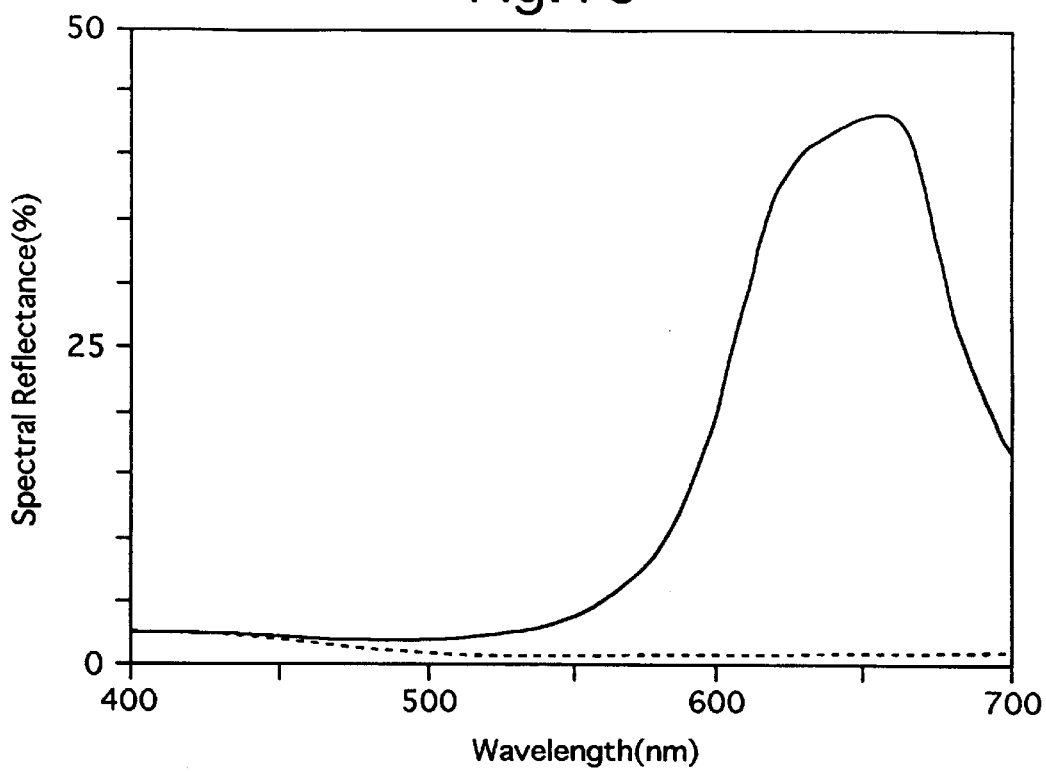
FIG. 10 shows light reflection characteristics of a liquid crystal display.

FIG. 10 shows spectral reflection characteristics of the above liquid crystal display in the selective reflection state and the transparent state. The solid line shows the spectral reflection characteristics in the selective reflection state, and the broken line shows the spectral reflection characteristics in the transparent state. The spectral reflection characteristics were measured by a spectrocolorimeter CM-1000 (Minolta).

As is apparent from FIG. 10, the reflectance or reflection factor is small over the entire range from 400 to 700 nm in the transparent state, and therefore a high transparency can be achieved. In the selective reflection state, a high reflection peak is attained at the vicinity of 650 nm, and the reflectance is small in a wavelength range shorter than 600 nm, which achieves clear red display.

EXPERIMENTAL EXAMPLE 4

The experiment was performed with a liquid crystal display having the structure shown in FIG. 1 and prepared in accordance with the same steps as the experimental example 1 except for that dyestuff was not added. A pulse voltage (±5 ms) of 150 V was applied across the conductive films of the liquid crystal display thus formed, so that red selective reflection occurred. At this time, luminous reflectance Y was 8.02, chromaticity coordinates were x=0.411 and y=0.315, and excitation purity was 76.6% (reference light: x=0.306, y=0.317). In this state, when a pulse voltage (±5 ms) of 70 V was applied, the liquid crystal display exhibited a transparent state (luminous reflectance Y=0.62, chromaticity coordinates: x=0.216 and y=0.170). In FIG. 9, a solid circular mark represents the chromaticity coordinate in the selective reflection state of the liquid crystal display of this experimental example.

As compared with the liquid crystal displays of the experimental examples 1–3 containing dyestuff added thereto, the liquid crystal display of this experimental example exhibits a low excitation purity in the selective reflection state and a high luminous reflectance in the transparent state, and therefore the display quality is low.

Figure 11:
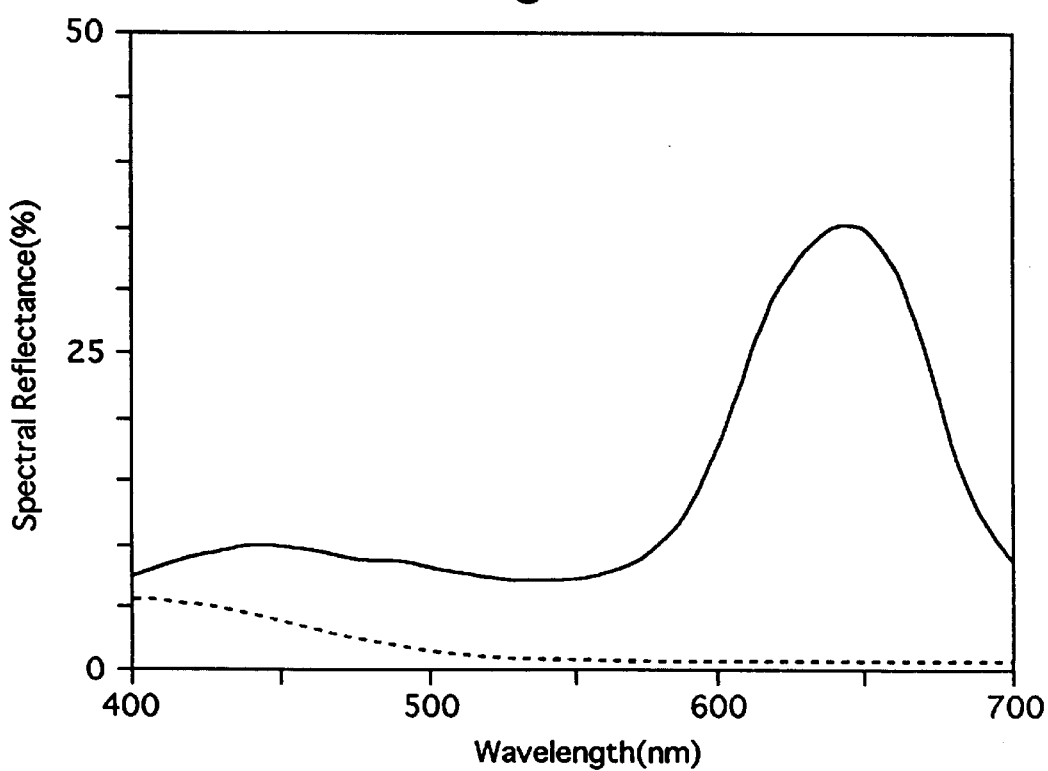
FIG. 11 shows light reflection characteristics of another liquid crystal display.

FIG. 11 shows spectral reflection properties of the above liquid crystal display in the selective reflection state and the transparent state. As compared with the liquid crystal display of the experimental example 3 to which dyestuff is added, the peak intensity at the selective reflection wavelength is low, and the luminous reflectance is high in the transparent state.

EXPERIMENTAL EXAMPLE 5

Figure 12:
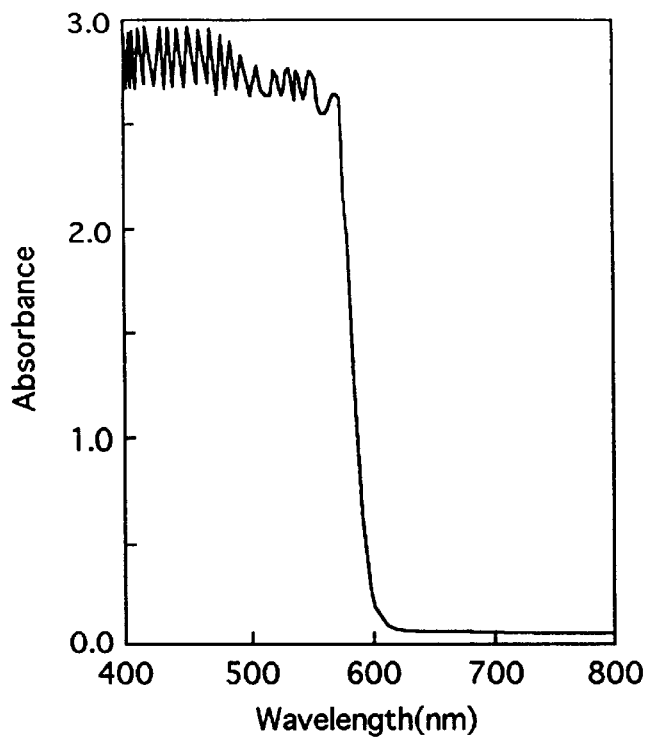
FIG. 12 shows a spectral characteristic of a color filter.

A liquid crystal display was prepared in accordance with the same steps as the experimental example 1 except for that dyestuff was not added. Then, a liquid crystal display of the structure shown in FIG. 2 was prepared by attaching a color filter (WRATTEN FILTER No. 25 manufactured by Eastman Kodak Co., Ltd.) to the surface of the above liquid crystal display at the observation side. FIG. 12 shows spectral characteristics of the color filter used in the experiment., A pulse voltage (±5 ms) of 150 V was applied across the conductive films of the liquid crystal display thus formed, so that red selective reflection occurred. At this time, luminous reflectance Y was 3.20, chromaticity coordinates were x=0.652 and y=0.310, and excitation purity was 90.0% (reference light: x=0.306, y=0.317). In this state, when a pulse voltage (±5 ms) of 70 V was applied, the liquid crystal display exhibited a transparent state (luminous reflectance Y=0.68, chromaticity coordinates: x=0.440 and y=0.336).

Figure 13:
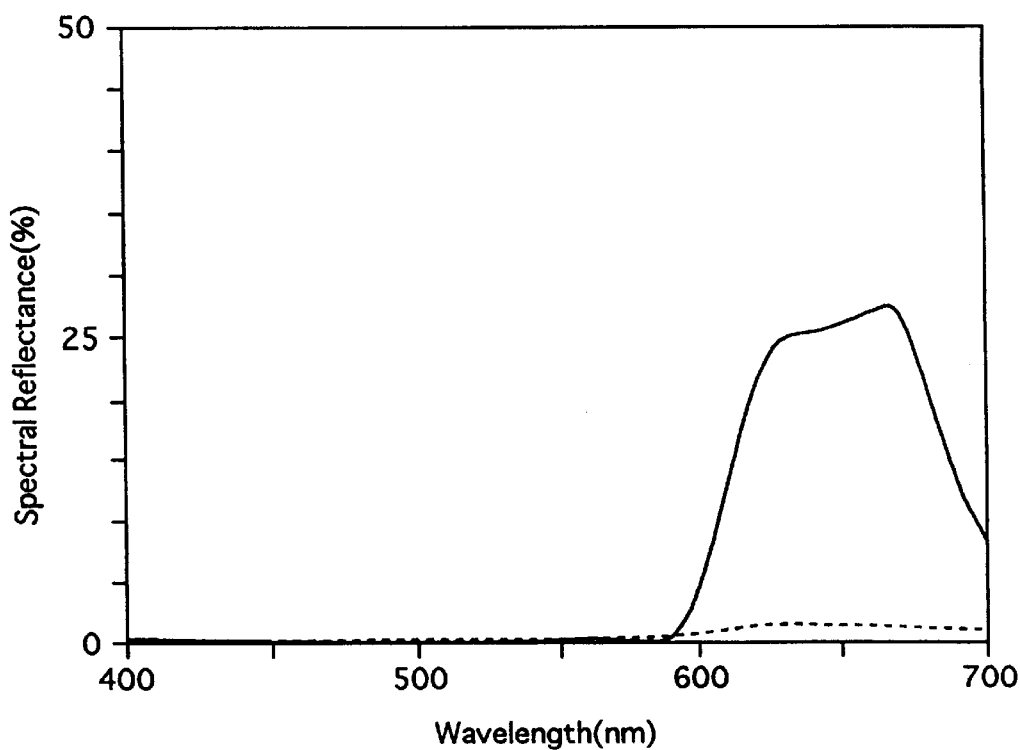
FIG. 13 shows light reflection characteristics of still another liquid crystal display.

FIG. 13 shows spectral reflection characteristics of the above liquid crystal display in the selective reflection state and the transparent state. As shown in FIG. 13, the reflectance is extremely small over the entire range from 400 to 700 nm in the transparent state. In the selective reflection state, substantially no reflectance occurs in a wavelength range shorter than 600 nm, so that a high display quality can be achieved.

EXPERIMENTAL EXAMPLE 6

A liquid crystal display was prepared in accordance with the same steps as the experimental example 5 except for that a color filter was attached to the surface opposite to the observation side. A pulse voltage (±5 ms) of 150 V was applied across the conductive films of the liquid crystal display thus formed, so that red selective reflection occurred. At this time, luminous reflectance Y was 8.10, chromaticity coordinates were x=0.410 and y=0.315, and excitation purity was 20% (reference light: x=0.306, y=0.317). In this state, when a pulse voltage (±5 ms) of 70 V was applied, the liquid crystal display exhibited a transparent state (luminous reflectance Y=0.65, chromaticity coordinates: x=0.210 and y=0.170).

The liquid crystal display exhibited spectral reflection characteristics in the selective reflection state and the transparent state which are similar to those of the experimental example 4.

EXPERIMENTAL EXAMPLE 7

A chiral nematic liquid crystal was prepared in accordance with the same steps as the experimental example 1, and a red dyestuff similar to that used in the experimental example 1 was added at 0.5 wt % to the liquid crystal thus formed. The chiral nematic liquid crystal containing the dyestuff was held between two glass plates provided at their surfaces with transparent conductive films directed inward with a spacer of 10 μm therebetween. In this manner, a liquid crystal display was prepared.

A pulse voltage (±5 ms) of 150 V was applied across the conductive films of the liquid crystal display thus formed, so that red selective reflection occurred. At this time, luminous reflectance Y was 5.64, chromaticity coordinates were x=0.531 and y=0.334, and excitation purity was 64.1% (reference light: x=0.306, y=0.317). In this state, when a pulse voltage (±5 ms) of 70 V was applied, the liquid crystal display exhibited a transparent state (luminous reflectance Y=1.19, chromaticity coordinates: x=0.328 and y=0.301).

EXPERIMENTAL EXAMPLE 8

A liquid crystal display was prepared in accordance with the same steps as the experimental example 7 except for that dyestuff was not added to thereto. A pulse voltage (±5 ms) of 150 V was applied across the conductive films of the liquid crystal display thus formed, so that red selective reflection occurred. At this time, luminous reflectance Y was 5.67, chromaticity coordinates were x=0.531 and y=0.334, and excitation purity was 64.2% (reference light: x=0.306, y=0.317). In this state, when a pulse voltage (±5 ms) of 70 V was applied, the liquid crystal display exhibited a transparent state (luminous reflectance Y=1.6, chromaticity coordinates: x=0.243 and y=0.238).

[Eighth Embodiment]

Figure 14:
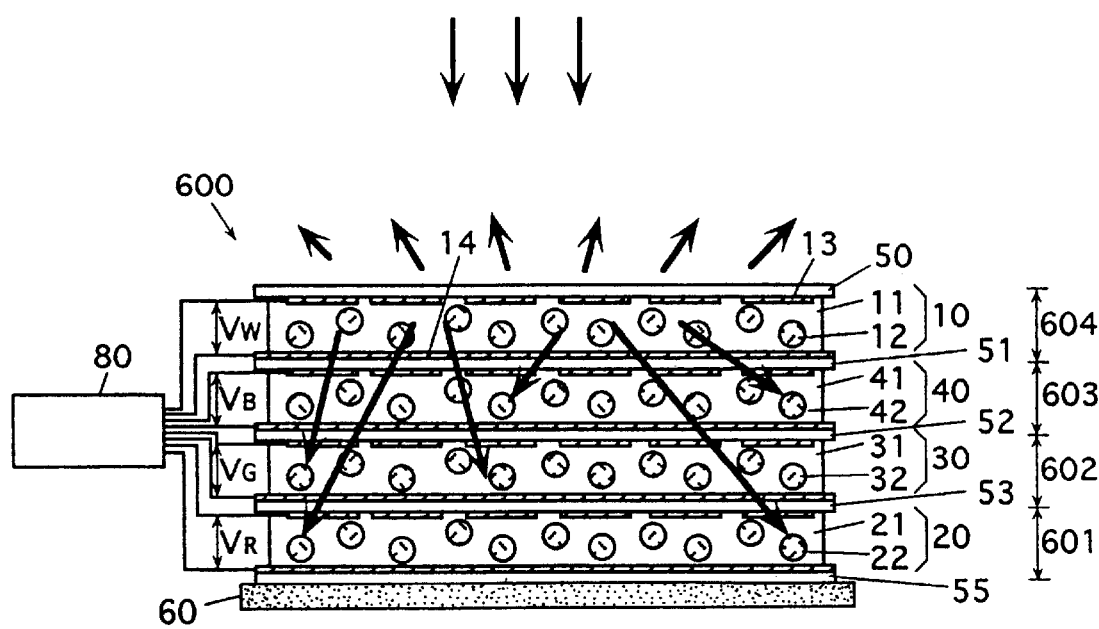
FIG. 14 is a cross section of a full-color liquid crystal display of an embodiment of the invention.

FIG. 14 is a cross section showing a full-color liquid crystal display 600 of an eighth embodiment of the invention. As shown in FIG. 14, the liquid crystal display 600 includes a red display layer 601 for red display, a green display layer 602 for green display, a blue display layer 603 for blue display and a white display 604 for white display which are layered in this order. These display layers are connected to a power supply 80 capable of controlling a voltage applied to each display layer independently of the other layers. At 60 is indicated the light absorbing member already described, which is provided if desired.

Each of the display layers 601–604 has a structure similar to the structure already described, and specifically includes sheet-like transparent electrodes as well as a liquid crystal and polymer composite film held between these transparent electrodes. The red, green and blue display layers 601, 602 and 603 are the same as those in the fourth embodiment except for that the coloring agent is not added thereto. Naturally, a coloring agent may be added to each of the display layers 601–603 as described before.

The white display layer 604 basically has such a structure that the liquid crystal and polymer composite film 10 is held between transparent electrodes 13 and 14 connected to a power supply 80, and is responsive to a voltage applied across the transparent electrodes to be switched between the light transmission state allowing transmission of visible rays and a light scattering state for scattering visible rays, and vice versa, which is a difference from the other display layers. The white display layer exhibits a white appearance in the light scattering state because it scatters the visible rays, and attains a colorless transparent state in the light transmission state because the visible rays pass therethrough.

Accordingly, when white rays of white light such as natural light are irradiated downward in FIG. 14 to the full-color liquid crystal display 600, at least one of the display layers can reflect the visible rays of a specific wavelength, so that a specific color is displayed and observed.

When the full-color liquid crystal display 600 performs color display, the white display layer 600 is in the light transmission state, and intended one or more of the color display layers 601–603 are in the selective reflection state. In this operation, when two or more color display layers 601–603 are simultaneously set to the selective reflection state, a mixed color can be displayed. When white display by the full-color liquid crystal display 600 is to be done, the white display layer 604 is set to the light scattering state.

The order of layering of the display layers is not restricted to that in FIG. 14, and may be arbitrarily determined. However, according to the structure shown in FIG. 14, in which the white display layer is arranged at the position nearest to the observation side, the reflection intensity for white display can be effectively increased.

In the structure where three color display layers for displaying red, green and blue are layered, the layering order of the blue, green and red display layers viewed from the observation side, which is employed in this embodiment, can suppress lowering of the intensity of reflection light.

The amount of added chiral dopant may be controlled to adjust the helical pitch of the chiral nematic liquid crystal so that the selective reflection wavelength corresponds to infrared rays. This provides a liquid crystal and polymer composite film, which attains a transparent state exhibiting a colorless transparent appearance in the planar state, and attains a light scattering state exhibiting a white appearance owing to isotropic scattering in a focal conic state. The liquid crystal and polymer composite film thus formed is arranged between the transparent electrodes, so that the white display layer is completed.

The film thickness of the liquid crystal and polymer composite film used in each display layer is not particularly restricted. However, it is preferable that the thickness of, the liquid crystal and polymer composite film for the white display layer is larger than that of the liquid crystal and polymer composite film for the color display layer.

[Ninth Embodiment]

A color display layer for a specific color may be formed of first and second display layers. The first layer has a composite film using a chiral nematic liquid crystal having a left optical activity (left optical rotary power). The second display layer has a composite film using a chiral nematic liquid crystal having a right optical activity (right optical rotary power) and operable to selectively reflect rays of the same wavelength as those selectively reflected by the above chiral nematic liquid crystal having a left optical activity. This structure increases the reflectance, and therefore can further improve the color display. In particular, a total color balance is improved by intensely displaying the blue and red, of which relative visibilities are lower than the green. Therefore, the above multilayer structures can be effectively employed in the blue display layer or red display layer.

[Tenth Embodiment]

Smectic liquid crystal may be added to the liquid crystal and polymer composite film for the white display layer. Addition of the smectic liquid crystal improves the transparency of the liquid crystal and polymer composite film, and therefore can improve a contrast between the colorless transparent state and the white state.

Specific experimental examples of the eighth embodiment will be described below in detail.

EXPERIMENTAL EXAMPLE 9

Fabrication of White Display Layer

A chiral nematic liquid crystal having a selective reflection wavelength of 1100 nm (helical pitch length of 685 nm) was prepared by such a manner that liquid crystal S2 (Merck Co., Ltd.) at 30 weight % exhibiting a smectic phase at a room temperature and chiral dopant S811 (Merck Co., Ltd.) at 19.8 weight % were added to tolane nematic liquid crystal MN1000XX (Chisso Co., Ltd., Δn=0.219, $T_{NI}$=69.9° C.) which contained fluorine and exhibited a nematic phase at a room temperature. Δn and $T_{N1}$ represent the same parameters as those in the experimental example 1.

Then, a photo-curing resin material was prepared by adding photo polymerization initiator DAROCUR1173 (Chiba Gaigy Co., Ltd.) at 3 weight % to monofunctional acrylate R128H (Nippon Kayaku Co., Ltd.).

The mixture of the chiral nematic liquid crystal and the photo-curing resin material at a weight ratio of 9:1 was held between two transparent conductive films with a spacer of 20 μm therebetween. Then, ultraviolet rays were irradiated at 15 mw/cm² to it at a room temperature for five minutes, whereby hardening and phase separation occurred. In this manner, the white display layer was completed. The phase transition temperature was 41.0° C.

The phase transition temperature was measured as follows. A portion of the liquid crystal and polymer composite film which was prepared in the same steps as the above was extracted as a specimen. This specimen in a thin form, which was held between slide and cover glasses, was observed with a polarization microscope, while its temperature was rising at a rate of about 1° C./minute, and the temperature at which isotropic phase started to appear was measured. The phase transition temperature was desirably 40° C. or more A pulse voltage (±5 ms) of 140 V was applied across the conductive films of the white display layer thus formed, so that the white display layer exhibited a transparent state (transmittance: 65%, color stimulus value: 3.5). In this state, when a pulse voltage (±5 ms) of 70 V was applied, the white display layer exhibited a light scattering state (transmittance: 2%). A time for switching between the transparent state and the scattering state is 500 ms.

The color stimulus value was measured by a spectrocolorimeter CM-1000 (Minolta). The color stimulus value of the display layers to be described later were also measured by the same meter. The color stimulus value in the colorless transparent state is desirable 4.5 or less. Desirably, the color stimulus value is 10.0 or more in the white state, 15.0 or more in the red state, 20.0 or more in the green state and 8.0 or more in the blue state.

The transmittance was measured in such a manner that a stabilized He—Ne laser was irradiated to the white display layer, and the intensity of transmitted rays or scattered rays was detected by a photodiode.

The switching time was measured by a digital oscilloscope (COR5521: manufactured by Kikusui Co., Ltd.), and specifically, a time from instantaneous change of orientation of liquid crystal molecules by application of high-voltage pulses to the display layer in the planar state to restoring to the state providing an initial transmittance.

The transmittance, phase transition temperature and switching time of the display layers to be described later were measured by the same manners as the above.

Figure 15:
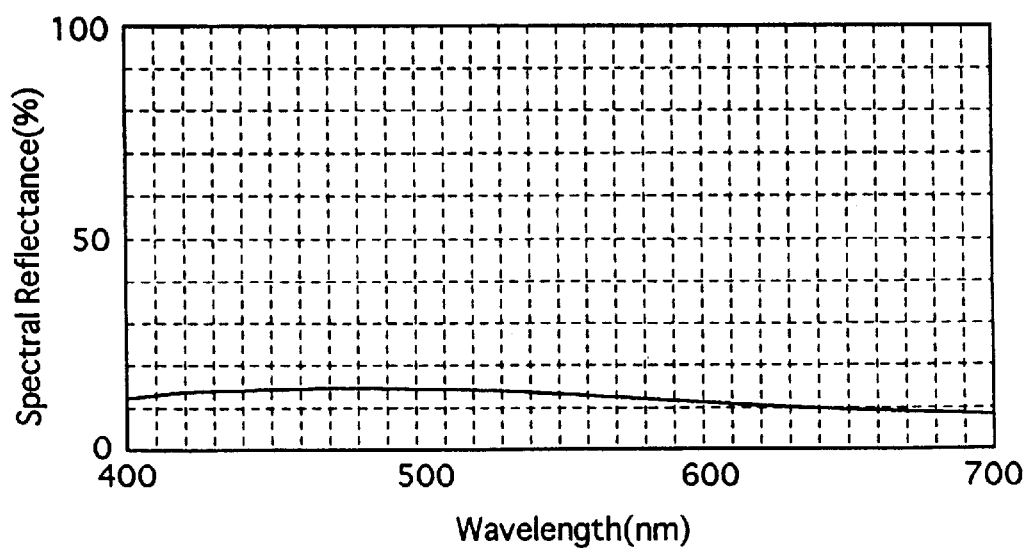
FIG. 15 shows a spectral reflection characteristic with a white display layer in a light scattering state.

FIG. 15 shows spectral reflection characteristics of the white display layer described above. As can be seen from FIG. 15, the spectral reflection characteristics of the white display layer are flat and do not have a peak. The spectral reflection characteristics were measured by a spectrocolorimeter CM-1000 (Minolta Co., Ltd.). The spectral reflection characteristics of the respective display layers described below were measured in the same manner.

Fabrication of Blue Display Layer

A chiral nematic liquid crystal having a selective reflection wavelength of 490 nm (helical pitch length of 303 nm) was prepared by such a manner that mixture of chiral dopant S811 and S1011 (both manufactured by Merck Co., Ltd.) at a weight ratio of 1:1 was added at 17.9 wt % to tolane nematic liquid crystal MN1000XX (Chisso Co., Ltd., $\Delta n=0.219$, $T_{NI}=69.9°$ C.) which contained fluorine and exhibited a nematic phase at a room temperature.

Then, a photo-curing resin material was prepared by adding photo polymerization initiator DAROCUR1173 (Chiba Gaigy Co., Ltd.) at 3 weight % to monofunctional acrylate R128H (Nippon Kayaku Co., Ltd.).

The mixture of the chiral nematic liquid crystal and the photo-curing resin material at a weight ratio of 7:1 was held between two transparent conductive films with a spacer of 10 μm therebetween. Then, ultraviolet rays were irradiated at 15 mW/cm² to it at a room temperature for five minutes, whereby hardening and phase separation occurred. In this manner, the blue display layer was completed. The phase transition temperature was 45.9° C.

A pulse voltage (±5 ms) of 130 V was applied across the conductive films of the blue display layer thus formed to perform selective reflection of the blue. In this state, when a pulse voltage (+5 ms) of 70 V was applied, the blue display layer exhibited a transparent state (color stimulus value: 3.5). A time for switching between the blue selective reflection state and the transparent state was 200 ms.

Figure 16:
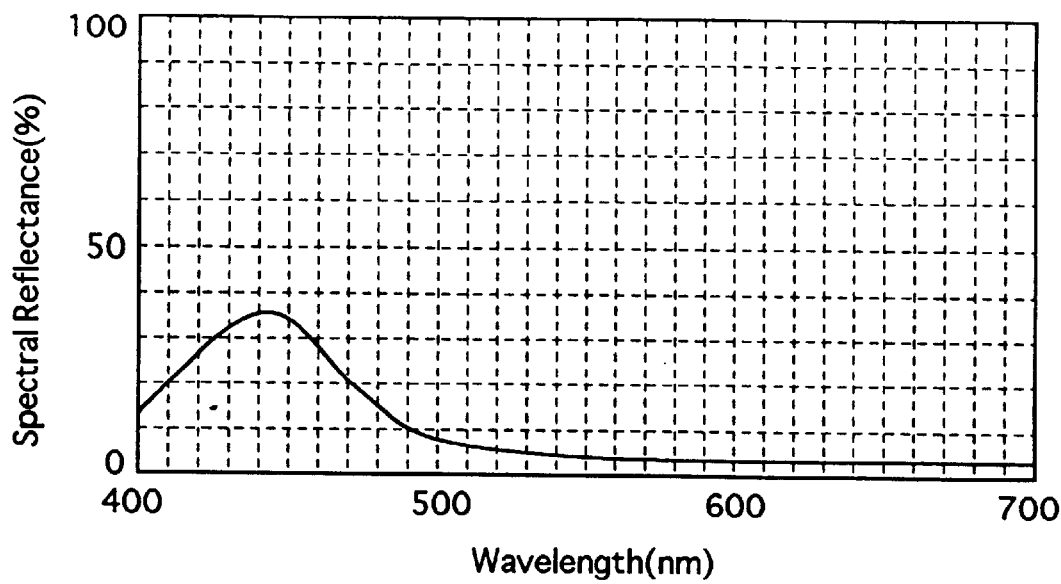
FIG. 16 shows a spectral reflection characteristic with a blue display layer in a selective reflection state.

FIG. 16 shows spectral reflection characteristics of the blue display layer in the blue selective reflection state.

Fabrication of Green Display Layer

A chiral nematic liquid crystal having a selective reflection wavelength of 570 nm (helical pitch length of 351 nm) was prepared by such a manner that mixture of chiral dopant S811 and S1011 (both manufactured by Merck Co., Ltd.) at a weight ratio of 1:1 was added at 15.1 wt % to tolane nematic liquid crystal MN1000XX (Chisso Co., Ltd., $\Delta n=0.219$, $T_{NI}=69.9°$ C.) which contained fluorine and exhibited a nematic phase at a room temperature.

Then, a photo-curing resin material was prepared by adding photo polymerization initiator DAROCUR1173 (Chiba Gaigy Co., Ltd.) at 3 weight % to monofunctional acrylate R128H (Nippon Kayaku Co., Ltd.).

The mixture of the chiral nematic liquid crystal and the photo-curing resin material at a weight ratio of 7:1 was held between two transparent conductive films with a spacer of 10 μm therebetween. Then, ultraviolet rays were irradiated at 15 mW/cm² to it at a room temperature for five minutes, whereby hardening and phase separation occurred. In this manner, the green display layer was completed. The phase transition temperature was 48.6° C.

A pulse voltage (±5 ms) of 120 V was applied across the conductive films of the green display layer thus formed to perform selective reflection of the green. In this state, when a pulse voltage (±5 ms) of 60 V was applied, the green display layer exhibited a transparent state (color stimulus value: 3.8). A time for switching between the green selective reflection state and the transparent state was 400 ms.

Figure 17:
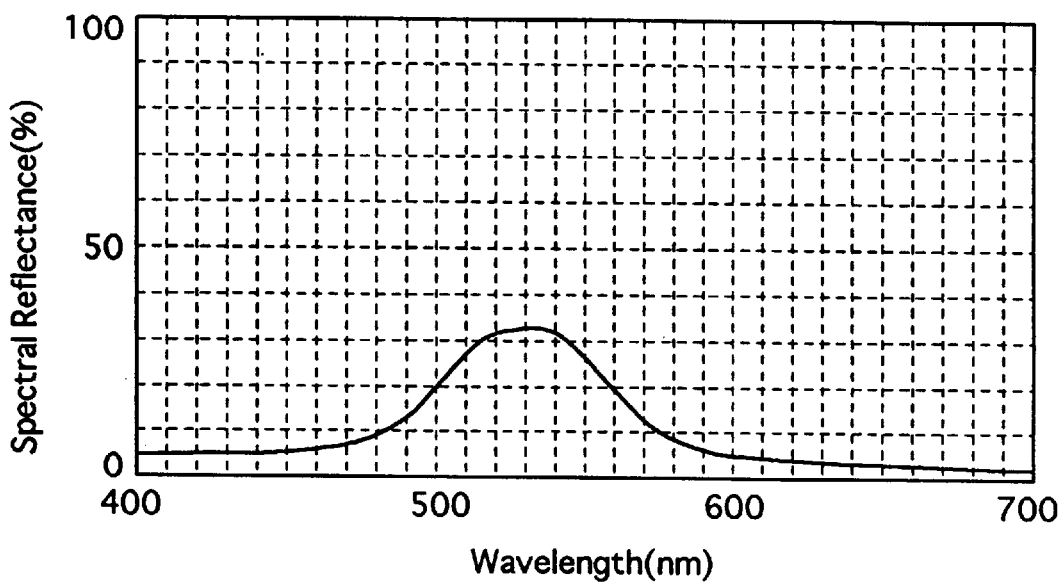
FIG. 17 shows a spectral reflection characteristic with a green display layer in a selective reflection state.

FIG. 17 shows spectral reflection characteristics of the green display layer in the green selective reflection state.

Fabrication of Red Display Layer

A chiral nematic liquid crystal having a selective reflection wavelength of 650 nm (helical pitch length of 400 nm) was prepared by such a manner that mixture of chiral dopant S811 and S1011 (both manufactured by Merck Co., Ltd.) at a weight ratio of 1:1 was added at 13.0 wt % to tolane nematic liquid crystal MN1000XX (Chisso Co., Ltd., $\Delta n=0.219$, $T_{NI}=69.9°$ C.) which contained fluorine and exhibited a nematic phase at a room temperature.

Then, a photo-curing resin material was prepared by adding photo polymerization initiator DAROCUR1173 (Chiba Gaigy Co., Ltd.) at 3 weight % to monofunctional acrylate R128H (Nippon Kayaku Co., Ltd.).

The mixture of the chiral nematic liquid crystal and the photo-curing resin material at a weight ratio of 7:1 was held between two transparent conductive films with a spacer of 10 μm therebetween. Then, ultraviolet rays were irradiated at 15 mW/cm² to it at a room temperature for five minutes, whereby hardening and phase separation occurred. In this manner, the red display layer was completed. The phase transition temperature was 51.6° C.

A pulse voltage (±5 ms) of 110 V was applied across the conductive films of the red display layer thus formed to perform selective reflection of the red. In this state, when a pulse voltage (±5 ms) of 50 V was applied, the red display layer exhibited a transparent state (color stimulus value: 4.2). A time for switching between the red selective reflection state and the transparent state was 500 ms.

Figure 18:
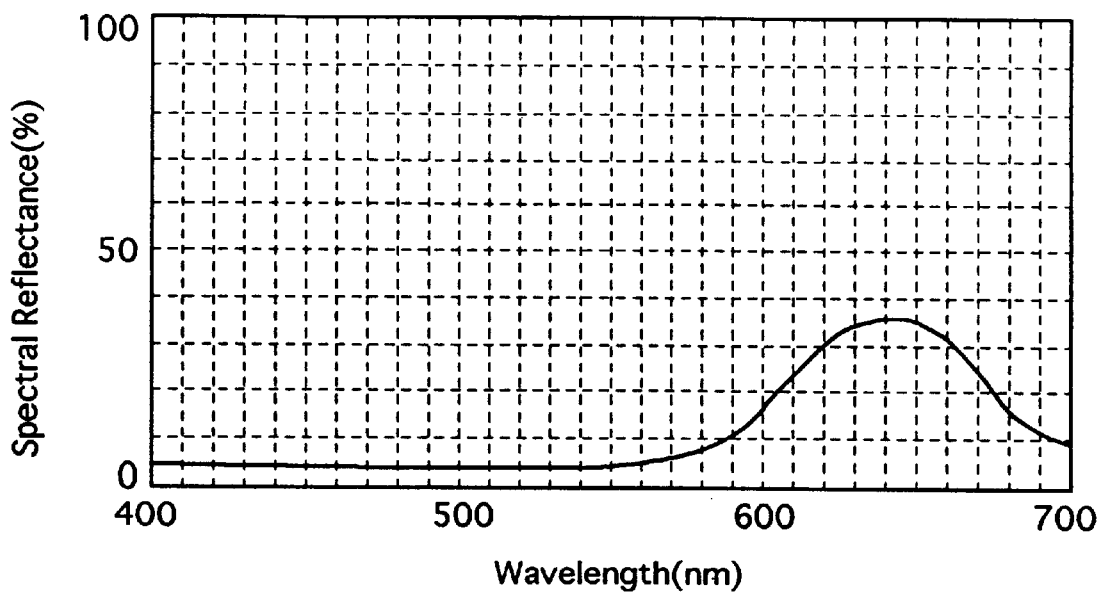
FIG. 18 shows a spectral reflection characteristic with a red display layer in a selective reflection state.

FIG. 18 shows spectral reflection characteristics of the red display layer in the red selective reflection state, Fabrication of Full-Color Liquid Crystal Display The red display layer was layered on the light absorbing member, i.e., black film, and then the green, blue and white display layers are successively layered thereon, so that the full-color liquid crystal display having the layered structure shown in FIG. 14 was fabricated. As shown in FIG. 14, the transparent plates were arranged between the light absorbing member and the red display layer, between the respective display layers and on the surface of the green display layer at the observation side, respectively.

As can be seen from FIGS. 16 to 18, each display layer has such spectral reflection characteristics that the transmittance at wavelengths shorter than the selective reflection wavelength of the display layer is lower than that at the wavelengths longer than the selective reflection wavelength of the display layer. In this experimental example, therefore, the blue, green and red display layers were layered in this order from the observation side, whereby reduction in quantity of reflected light was prevented.

Mixture of two kinds of chiral dopant was used for fabricating each of the blue, green and red display layers in this experimental example. Thereby, the phase transition temperature could be higher than that in the case of using single kind of chiral dopant, which improved the transparency in the transparent state of the polymer dispersion liquid crystal, and reduced the time for switching between the transparent state and the selective reflection state of each color display layer.

Table 1 shows kinds of pulse voltages applied to the respective display layers for white display and the states of the respective display layers. Table 2 relates to an example of green display, and shows kinds of pulse voltages applied to the respective display layers for color display and the states of the respective display layers.

TABLE 1

| | White Display | |
|---|---|---|
| Layers | States | Applied Pulses |
| White Layer | Scattering | Low |
| Blue Layer | Selective Reflection | High |
| Green Layer | Selective Reflection | High |
| Red Layer | Selective Reflection | High |

TABLE 2

| | Color Display (Green Display) | |
|---|---|---|
| Layers | States | Applied Pulses |
| White Layer | Light Transmission | High |
| Blue Layer | Light Transmission | Low |
| Green Layer | Selective Reflection | High |
| Red Layer | Light Transmission | Low |

Figure 19:
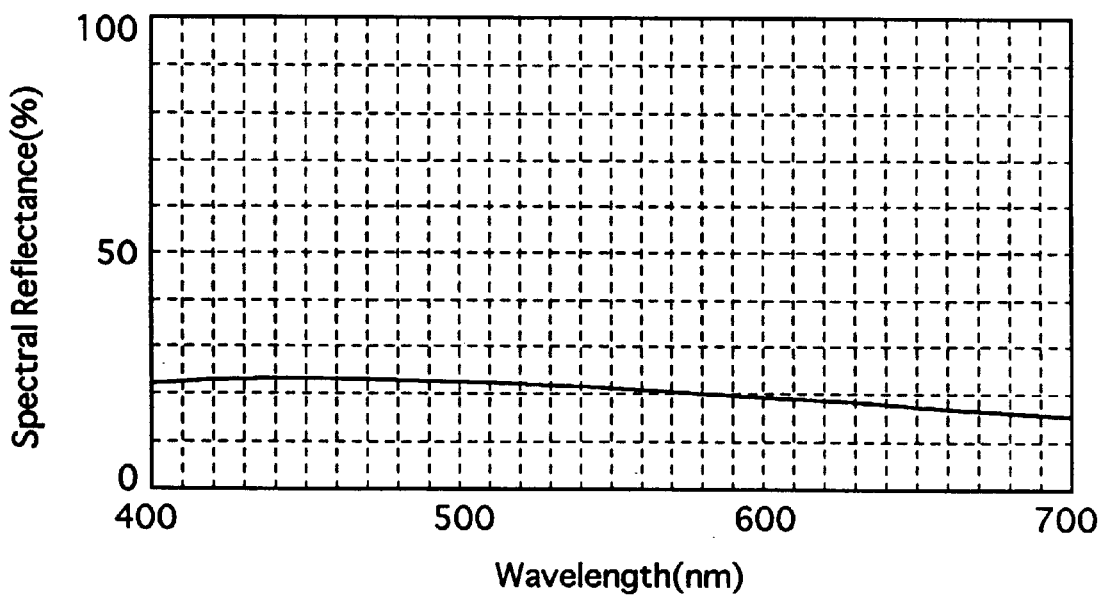
FIG. 19 shows a spectral reflection characteristic in the case where the full-color liquid crystal display in FIG. 14 performs white display.

FIG. 19 shows spectral reflection characteristics in the case where the full-color liquid crystal display performs the white display, i.e., in the case where the white display layer is in the light scattering state, and the red, green and blue display layers are in the selective reflection state.

As shown in FIG. 19, the spectral reflection characteristics are flat and do not have a peak value. A good white appearance can be achieved even when the display is viewed obliquely. It is considered that the fact that the white display layer itself has the flat spectral reflection characteristics without a peak value as described in connection with FIG. 15 contributes to this good appearance.

As can be seen from comparison between FIGS. 19 and 15, the full-color liquid crystal display of this experimental example has a high reflectance, and can perform monochrome display with a high contrast. According to the specific measurement, the contrast of about 3:1 was obtained from the structure in which the white display layer was arranged on the light absorbing member, but the contrast of 6:1 was obtained when the full-color liquid crystal display of this experimental example performed the white display in the manner shown in FIG. 1.

In the structure of this experimental example in which the white display layer is arranged at the observation side with respect to the color display layers, rays transmitted from the observation side are scattered, when the white display layer is in the light scattering state, so that rays enter the color display layers at various angles. Therefore, the color display layers reflect the rays in various angles, so that the display can provide the flat spectral reflection characteristics as a whole. In addition to this, a large amount of light is reflected by the color display layers to the white display layer, so that a high reflectance can be obtained.

In FIG. 14, black arrows schematically show a manner of reflection and scattering of incident rays to the full-color liquid crystal display.

EXPERIMENTAL EXAMPLE 10

Figure 20:
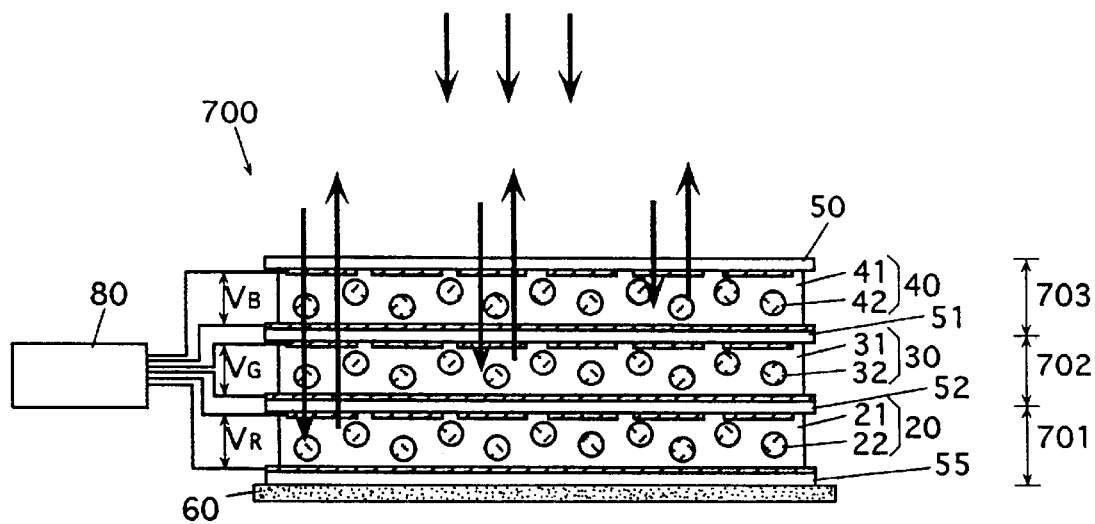
FIG. 20 is a cross section of a full-color liquid crystal display including display layers of blue, green and red color in a layered form.

This example used a full-color liquid crystal display 700 which was similar to that of the experimental example 9 except for that a white display layer was not provided, and which included red, green and blue display layers layered on a light absorbing member. FIG. 20 shows a cross section of the liquid crystal display thus formed. In FIG. 20, the same parts and portions as those in FIG. 14 bear the same reference numbers.

Figure 21:
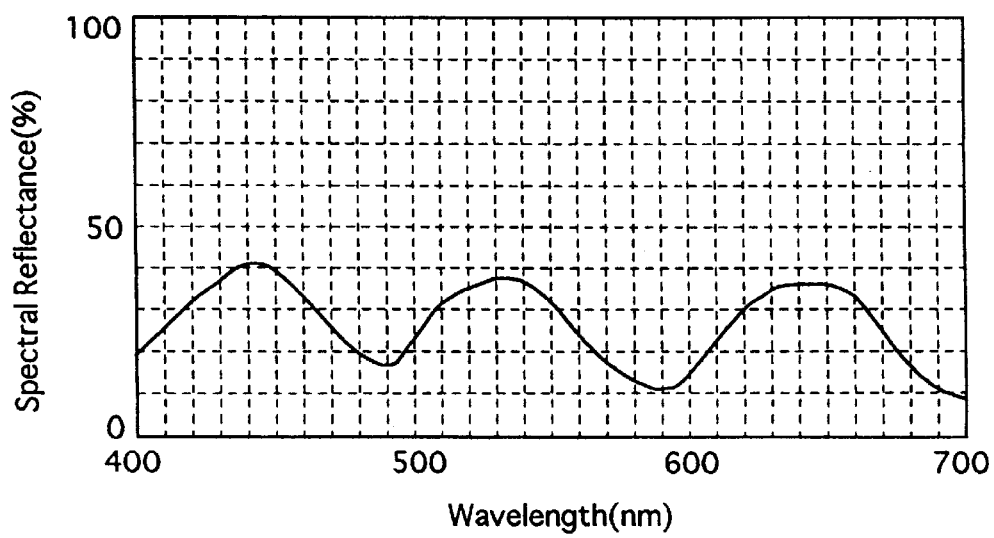
FIG. 21 shows a spectral reflection characteristic of the full-color liquid crystal display in FIG. 20 with all the display layers in the selective reflection state.

FIG. 21 shows spectral reflection characteristics of the full-color liquid crystal display 700 in the case where all of the red, green and blue display layers are in the selective reflection state. As shown in FIG. 21, the spectral spectrum exhibits a convex form. Even if the full-color display is set to exhibit a white appearance when view perpendicularly to the observation surface, it does not exhibit a white appearance when viewed obliquely, and it is difficult to exhibit a good monochrome appearance. This is probably due to the fact that the spectrum shifts toward the shorter wavelength side in accordance with the following formula [II].

$$\lambda = \lambda_0 \cos\theta' = \lambda_0 (1 - \sin^2\theta/n^2)^{1/2} \quad [II]$$

where λ represents a wavelength of rays reflected by the observed display layer, and $\lambda_0$ represents the selective reflection wavelength of each display layer. θ' represents an angle between the travelling direction of rays in the liquid crystal and polymer composite film and the helical axis in the state that the rays are irradiated toward a reference point on the observation surface of the display layer and in the direction along line connecting the reference point and the observation point. θ represents an angle of the line connecting the observation point and the reference point on the observation surface with respect to the direction perpendicular to the observation surface, n represents an average refractive index satisfying $n^2 = (n_1^2 + n_2^2)/2$.

EXPERIMENTAL EXAMPLE 11

Fabrication of Green Display Layer

A chiral nematic liquid crystal having a selective reflection wavelength of 570 nm (helical pitch length of 353 nm) was prepared by such a manner that mixture of chiral dopant S811 and S1011 (both manufactured by Merck Co., Ltd.) at a weight ratio of 1:1 was added at 13.2 wt % to tolane nematic liquid crystal MN1008XX (Chisso Co., Ltd., Δn=0.218, $T_{NI}$=73.9° C.) which contained fluorine and exhibited a nematic phase at a room temperature.

Then, a photo-curing resin material was prepared by adding photo polymerization initiator DAROCUR1173 (Chiba Gaigy Co., Ltd.) at 3 weight % to monofunctional acrylate R128H (Nippon Kayaku Co., Ltd.).

The mixture of the chiral nematic liquid crystal and the photo-curing resin material at a weight ratio of 7:1 was held between two transparent conductive films with a spacer of 10 μm therebetween. Then, ultraviolet rays were irradiated at 15 mW/cm² to it at a room temperature for five minutes, whereby hardening and phase separation occurred. In this manner, the green display layer was completed. The phase transition temperature was 52.4° C.

A pulse voltage (±5 ms) of 120 V was applied across the conductive films of the green display layer thus formed to perform selective reflection of the green. In this state, when a pulse voltage (±5 ms) of 60 V was applied, the green display layer exhibited a transparent state (color stimulus value: 3.6). A time for switching between the green selective reflection state and the transparent state was 400 ms.

In this manner, even the liquid crystal other than the tolane liquid crystal containing fluorine can be used to form the liquid crystal display layer having a superior performance similarly to that of the experimental example 9.

EXPERIMENTAL EXAMPLE 12

Fabrication of Green Display Layer

A chiral nematic liquid crystal having a selective reflection wavelength of 570 nm (helical pitch length of 355 nm) was prepared by such a manner that mixture of chiral dopant S811 and S1011 (both manufactured by Merck Co., Ltd.) at a weight ratio of 1:1 was added at 14.3 wt % to cyanobiphenyl nematic liquid crystal E31LV (Merck Co., Ltd., Δn=0.227, $T_{NI}$=61.5° C.) which exhibited a nematic phase at a room temperature.

Then, a photo-curing resin material was prepared by adding photo polymerization initiator DAROCUR1173 (Chiba Gaigy Co., Ltd.) at 3 weight % to monofunctional acrylate R128H (Nippon Kayaku Co., Ltd.).

The mixture of the chiral nematic liquid crystal and the photo-curing resin material at a weight ratio of 7:1 was held between two transparent conductive films with a spacer of 10 μm therebetween. Then, ultraviolet rays were irradiated at 15 mW/cm² to it at a room temperature for five minutes, whereby hardening and phase separation occurred. In this manner, the green display layer was completed. The phase transition temperature was 29.2° C.

A pulse voltage (±5 ms) of 100 V was applied across the conductive films of the green display layer thus formed to perform selective reflection of the green. In this state, when a pulse voltage (±5 ms) of 60 V was applied, the green display layer exhibited a transparent state (color stimulus value: 6.0). A time for switching between the green selective reflection state and the transparent state was 200 ms.

EXPERIMENTAL EXAMPLE 13

Fabrication of Blue Display Layer

A chiral nematic liquid crystal having a selective reflection wavelength of 460 nm (helical pitch length of 290 nm) was prepared by such a manner that chiral dopant S811 (manufactured by Merck Co., Ltd.) was added at 38.6 wt % to tolane nematic liquid crystal MN10000XX (Chisso Co., Ltd., Δn=0.219, $T_{NI}$=69.9° C.) which contained fluorine and exhibited a nematic phase at a room temperature.

Then, a photo-curing resin material was prepared by adding photo polymerization initiator DAROCUR1173 (Chiba Gaigy Co., Ltd.) at 3 weight % to monofunctional acrylate R128H (Nippon Kayaku Co., Ltd.).

The mixture of the chiral nematic liquid crystal and the photo-curing resin material at a weight ratio of 7:1 was held between two transparent conductive films with a spacer of 10 μm therebetween. Then, ultraviolet rays were irradiated at 15 mW/cm² to it at a room temperature for five minutes, whereby hardening and phase separation occurred. In this manner, the blue display layer was completed.

The phase transition temperature of the layer thus formed was 24.0° C. Therefore, various kinds of properties were measured at 20° C. A pulse voltage (±5 ms) of 130 V was applied across the conductive films of the blue display layer thus formed to perform selective reflection of the blue. In this state, when a pulse voltage (±5 ms) of 70 V was applied, the blue display layer exhibited a transparent state (color stimulus value: 3.5). A time for switching between the blue selective reflection state and the transparent state was 200 ms.

EXPERIMENTAL EXAMPLE 14

Fabrication of Green Display Layer

A chiral nematic liquid crystal having a selective reflection wavelength of 570 nm (helical pitch length of 355 nm) was prepared by such a manner that chiral dopant S811 (Merck Co., Ltd.) was added at 31.0 wt % to tolane nematic liquid crystal MN1000XX (Chisso Co., Ltd., Δn=0.219, $T_{NI}$=69.9° C.) which contained fluorine and exhibited a nematic phase at a room temperature.

Then, a photo-curing resin material was prepared by adding photo polymerization initiator DAROCUR1173 (Chiba Gaigy Co., Ltd.) at 3 weight % to monofunctional acrylate R128H (Nippon Kayaku Co., Ltd.).

The mixture of the chiral nematic liquid crystal and the photo-curing resin material at a weight ratio of 7:1 was held between two transparent conductive films with a spacer of 10 μm therebetween. Then, ultraviolet rays were irradiated at 15 mW/cm² to it at a room temperature for five minutes, whereby hardening and phase separation occurred. In this manner, the green display layer was completed. The phase transition temperature was 30.2° C.

A pulse voltage (±5 ms) of 100 V was applied across the conductive films of the green display layer thus formed to perform selective reflection of the green. In this state, when a pulse voltage (±5 ms) of 70 V was applied, the green display layer exhibited a transparent state (color stimulus value: 4.3). A time for switching between the green selective reflection state and the transparent state was 500 ms.

EXPERIMENTAL EXAMPLE 15

Fabrication of Blue Display Layer

A chiral nematic liquid crystal having a selective reflection wavelength of 460 nm (helical pitch length of 290 nm) was prepared by such a manner that mixture of chiral dopant S811 and CN (both manufactured by Merck Co., Ltd.) at a weight ratio of 1:1 was added at 29.0 wt % to tolane nematic liquid crystal MN1000XX (Chisso Co., Ltd., Δn=0.219, $T_{NI}$=69.9° C.) which contained fluorine and exhibited a nematic phase at a room temperature.

Then, a photo-curing resin material was prepared by adding photo polymerization initiator DAROCUR1173 (Chiba Gaigy Co., Ltd.) at 3 weight % to monofunctional acrylate R128H (Nippon Kayaku Co., Ltd.).

The mixture of the chiral nematic liquid crystal and the photo-curing resin material at a weight ratio of 7:1 was held between two transparent conductive films with a spacer of 10 μm therebetween. Then, ultraviolet rays were irradiated at 15 mW/cm² to it at a room temperature for five minutes, whereby hardening and phase separation occurred. In this manner, the blue display layer was completed. The phase transition temperature was 48.0° C.

A pulse voltage (±5 ms) of 150 V was applied across the conductive films of the blue display layer thus formed to perform selective reflection of the blue. In this state, when a pulse voltage (±5 ms) of 80 V was applied, the blue display layer exhibited a transparent state (color stimulus value: 4.5). A time for switching between the blue selective reflection state and the transparent state was 10 ms.

EXPERIMENTAL EXAMPLE 16

This experimental example used a blue display layer formed of two blue display layers which were layered together. One of the layered blue display layers used a chiral nematic liquid crystal having a left optical activity (optical rotary power). The other used a cholesteric nematic liquid crystal having a right optical activity.

Fabrication of Blue Display Layer

A chiral nematic liquid crystal having a selective reflection wavelength of 490 nm (helical pitch length of 303 nm) was prepared by such a manner that mixture of chiral dopant R811 having a right optical activity and R1011 having a right optical activity (both manufactured by Merck Co., Ltd.) at a weight ratio of 1:1 was added at 17.9 wt % to tolane nematic liquid crystal MN1000XX (Chisso Co., Ltd., Δn=0.219, $T_{NI}$=69.9° C.) which contained fluorine and exhibited a nematic phase at a room temperature.

Then, a photo-curing resin material was prepared by adding photo polymerization initiator DAROCUR1173 (Chiba Gaigy Co., Ltd.) at 3 weight % to monofunctional acrylate R128H (Nippon Kayaku Co., Ltd.).

The mixture of the chiral nematic liquid crystal and the photo-curing resin material at a weight ratio of 7:1 was held between two transparent conductive films with a spacer of 10 μm therebetween. Then, ultraviolet rays were irradiated at 15 mW/cm² to it at a room temperature for five minutes, whereby hardening and phase separation occurred. In this manner, the blue display layer was completed. The phase transition temperature was 45.9° C.

A pulse voltage (±5 ms) of 130 V was applied across the conductive films of the blue display layer thus formed to perform selective reflection of the blue. In this state, when a pulse voltage (±5 ms) of 70 V was applied, the blue display layer exhibited a transparent state (color stimulus value: 3.5). A time for switching between the blue selective reflection state and the transparent state was 200 ms.

Figure 22:
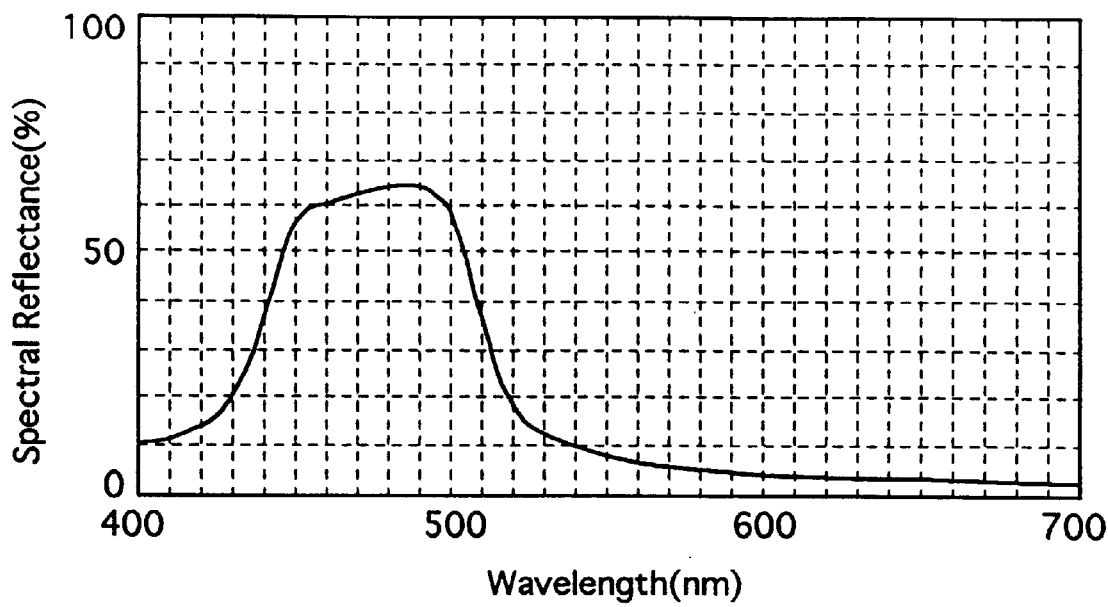
FIG. 22 shows a spectral reflection characteristic of a blue display layer formed of two layered display layers containing different kinds of chiral dopant of different optical activities or optical rotary powers, respectively.

The blue display layer thus fabricated was layered on the blue display layer fabricated in the experimental example 9, and the spectral reflectance was measured. Both the chiral dopant S811 and S1011, which were used for fabricating the blue display layer of the experimental example 9, have a left optical activity. The results are shown in FIG. 22. As can be seen from comparison between FIG. 22 and FIG. 16 relating to the experimental example 9, the reflectance in the selective reflection wavelength range is higher than that of a single layer structure.

In the cholesteric liquid crystal, it is considered that rays inciding parallel to the helical axis in the planar state are divided into two circularly polarized light groups of right and left optical activities, one of which is used in selective reflection. Therefore, the other light group is to have transmitted therethrough. However, owing to provision of the two layers having right and left optical activities, respectively, it is considered that the rays transmitted through one of the layers are reflected by the other layer, resulting in increase in reflectance.

As described above, the reflectance can be increased by provision of the two, i.e., first and second display layers layered together, one using the chiral nematic liquid crystal of the left optical activity and the other using the chiral nematic liquid crystal of the right optical activity. Therefore, in the display including the layered structure of multiple color display layers as described in the experimental example 9, the above structure can be effectively applied to the color display layers, and particularly to the blue display layer for blue display and the red display layer for red display.

EXPERIMENTAL EXAMPLE 17

This experimental example used a red display layer formed of two red display layers which were layered together. One of the layered red display layers used a chiral nematic liquid crystal having a left optical activity. The other used a chiral nematic liquid crystal having a right optical activity.

Fabrication of Red Display Layer

A chiral nematic liquid crystal having a selective reflection wavelength of 650 nm (helical pitch length of 400 nm) was prepared by such a manner that mixture of chiral dopant S811 of a right optical activity and R1011 of a right optical activity (both manufactured by Merck Co., Ltd.) at a weight ratio of 1:1 was added at 13.0 wt % to tolane nematic liquid crystal MN1000XX (Chisso Co., Ltd., Δn=0.219, $T_{NI}$=69.9°

C.) which contained fluorine and exhibited a nematic phase at a room temperature.

Then, a photo-curing resin material was prepared by adding photo polymerization initiator DAROCUR1173 (Chiba Gaigy Co., Ltd.) at 3 weight % to monofunctional acrylate R128H (Nippon Kayaku Co., Ltd.).

The mixture of the chiral nematic liquid crystal and the photo-curing resin material at a weight ratio of 7:1 was held between two transparent conductive films with a spacer of 10 $\mu$m therebetween. Then, ultraviolet rays were irradiated at 15 mW/cm$^2$ to it at a room temperature for five minutes, whereby hardening and phase separation occurred. In this manner, the red display layer was completed. The phase transition temperature was 51.6° C.

A pulse voltage (±5 ms) of 110 V was applied across the conductive films of the red display layer thus formed to perform selective reflection of the red. In this state, when a pulse voltage (±5 ms) of 50 V was applied, the red display layer exhibited a transparent state (color stimulus value: 4.2). A time for switching between the blue selective reflection state and the transparent state was 500 ms.

Figure 23:
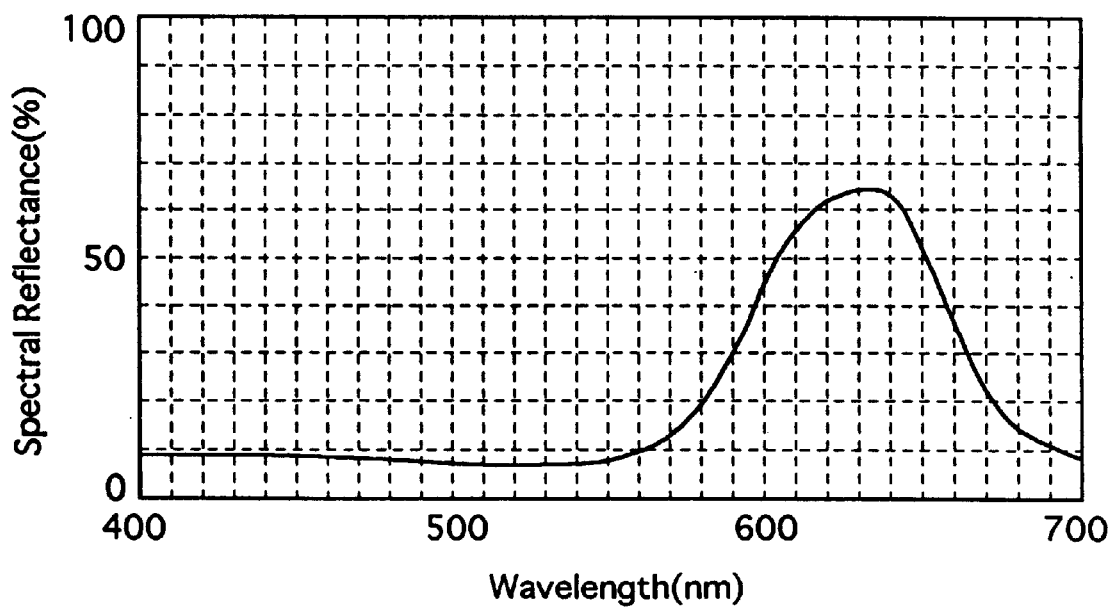
FIG. 23 shows a spectral reflection characteristic of a red display layer formed of two layered display layers containing different kinds of chiral dopant of different optical activities or optical rotary powers, respectively.

The red display layer thus fabricated was layered on the red display layer fabricated in the experimental example 9, and the spectral reflectance was measured. The results are shown in FIG. 23. As can be seen from comparison between FIG. 23 and FIG. 18 relating to the experimental example 9, the reflectance in the selective reflection wavelength range is higher than that of a single layer structure.

Although the present invention has been fully described by way of example with reference to the accompanying drawings, it is to be noted that various changes and modifications will be apparent to those skilled in the art.

Therefore, unless otherwise such changes and modifications depart from the scope of the present invention, they should be constructed as being included therein.

What is claimed is:

1. A liquid crystal reflective display comprising:
   a plurality of display layers layered on each other and each containing cholesteric liquid crystal capable of selective reflection of spectral rays of a specific wavelength in a visible range, wherein
   at least one of said plurality of display layers that is located at a position not farther than a predetermined one of said display layers from an observation side contains a coloring agent absorbing spectral rays in a wavelength range different from the selective reflection wavelength of said cholesteric liquid crystal contained in said predetermined-display layer.

2. A liquid crystal reflective display according to claim 1, wherein the at least one of said plurality of display layers that contains said coloring agent is located at the observation side with respect to said predetermined display layer, and the coloring agent absorbs spectral rays in a wavelength range different from the selective reflection wavelength of the cholesteric liquid crystal contained in the at least one of said plurality of display layers.

3. A liquid crystal reflective display according to claim 1, wherein said plurality of liquid crystal display layers layered together have shorter selective reflection wavelengths as the position moves toward an observation side.

4. A liquid crystal reflective display according to claim 1, wherein said plurality of liquid crystal display layers include a blue display layer for selective reflection of blue, a green display layer for selective reflection of green and a red display layer for selective reflection of red which are layered in this order from the observation side.

5. A liquid crystal reflective display according to claim 1, wherein said plurality of liquid crystal display layers each include said cholesteric liquid crystal and a carrier carrying the same.

6. A liquid crystal reflective display according to claim 5, wherein said carriers comprise a plurality of transparent substrates holding said cholesteric liquid crystal therebetween.

7. A liquid crystal reflective display according to claim 1, wherein said coloring agent has an absorbing peak in a wavelength range different from the selective reflection wavelength of said cholesteric liquid crystal contained in said predetermined display layer.

8. A liquid crystal reflective display according to claim 7, wherein the absorbing peak of said coloring agent is in a wavelength range shorter than the selective reflection wavelength of said cholesteric liquid crystal contained in said predetermined display layer.

9. A liquid crystal reflective display according to claim 2, wherein said coloring agent has an absorbing peak in a wavelength range different from the selective reflection wavelength of said cholesteric liquid crystal contained in the at least one of said plurality of display layers.

10. A liquid crystal reflective display according to claim 9, wherein the absorbing peak at a wavelength range shorter than the selective reflection wavelength of said cholesteric liquid crystal contained in the at least one of said plurality of display layers.

11. A liquid crystal reflective display according to claim 1, wherein one of said plurality of display layers comprises a red display layer for red color reflection.

12. A liquid crystal reflective display according to claim 11, wherein said red display layer comprises a red coloring agent.

13. A liquid, crystal display according to claim 1, wherein one of said plurality of display layers comprises a green display layer for green color reflection.

14. A liquid crystal reflective display according to claim 13, wherein said green display layer comprises a blue-absorption coloring agent.

15. A liquid crystal reflective display according to claim 14, wherein said blue-absorption coloring agent is a yellow coloring agent or a green coloring agent.

16. A liquid crystal reflective display according to claim 11, wherein another one of said plurality of display layers comprises a green display layer for green color reflection, and
   said green display layer is located on the observation side with respect to said red display layer.

17. A liquid crystal reflective display according to claim 16, wherein said green display layer comprises a blue-absorption coloring agent.

18. A liquid crystal reflective display according to claim 17, wherein said red display layer comprises a red coloring agent.

19. A liquid crystal reflective display according to claim 1, wherein each of said plurality of display layers includes said coloring agent.

20. A liquid crystal reflective display according to claim 1, wherein each cholesteric liquid crystal is, in response to an electrical field applied thereto, capable of transforming between a selective reflection state for selectively reflecting visible rays of a specific wavelength and a light transmitting state for transmitting visible rays therethrough.

21. A liquid crystal, reflective display according to claim 1, wherein each cholesteric liquid crystal is, in response to an electrical field applied thereto, capable of transforming between a planer state for selectively reflecting visible rays of a specific wavelength and a focal-conic state for transmitting visible rays therethrough.

22. A liquid crystal reflective display according to claim 1, wherein each of said plurality of display layers is capable of maintaining a display content without an application of an electrical field.

23. A liquid crystal reflective display according to claim 1, further comprising:
a light-absorption layer located at a position farther from the observation side than any one of said plurality of display layers.

24. A liquid crystal reflective display according to claim 1, wherein said coloring agent comprises a dye.

25. A liquid crystal reflective display according to claim 1, wherein said plurality of display layers comprise a pair of display layers for reflections of light components having a same color and mutually different optical rotations.

26. A liquid crystal reflective display according to claim 25, wherein one of said pair of display layer that is located on an observation side comprises said coloring agent.

27. A liquid crystal reflective display according to claim 1, wherein said coloring agent shows a weak absorption in a range of reflection wavelengths of said cholesteric liquid crystal contained in said predetermined display layer.

28. A liquid crystal reflective display according to claim 1, wherein said cholesteric liquid crystal contained in each of said plurality of display layers comprises a nematic liquid crystal and a chiral dopant.

29. A liquid crystal reflective display according to claim 28, wherein each of said chiral dopants comprises a plurality of kinds of chiral dopants.

30. A liquid crystal reflective display according to claim 6 wherein a single transparent substrate is provided between neighboring ones of said plurality of display layers.

31. A liquid crystal reflective display according to claim 6, wherein each transparent substrate comprises a plurality of electrodes thereon.

32. A liquid crystal reflective display according to claim 4, wherein said red display layer comprises a red coloring agent.

33. A liquid crystal reflective display according to claim 32, wherein said green display layer comprises a blue-absorption coloring agent.

34. A liquid crystal reflective display according to claim 1, wherein said coloring agent is contained in said cholesteric liquid crystal contained in said at least one of said plurality of display layers.

* * * * *